United States Patent
Kunihiro et al.

(10) Patent No.: US 9,669,866 B2
(45) Date of Patent: Jun. 6, 2017

(54) STEERING INTENTION DETERMINATION DEVICE, VEHICLE CONTROL DEVICE, STEERING ASSIST DEVICE, AND STEERING ASSIST SYSTEM

(71) Applicant: TOYOTA JIDOSHA KABUSHIKI KAISHA, Toyota-shi, Aichi-ken (JP)

(72) Inventors: Yoji Kunihiro, Susono (JP); Takahiro Kojo, Gotenba (JP); Yoshiaki Suzuki, Shizuoka-ken (JP); Yoshio Kudo, Machida (JP); Masao Ueyama, Mishima (JP); Takeshi Goto, Toyota (JP); Yukihide Kimura, Gotenba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/662,633

(22) Filed: Mar. 19, 2015

(65) Prior Publication Data

US 2015/0266504 A1    Sep. 24, 2015

(30) Foreign Application Priority Data

Mar. 20, 2014 (JP) ................. 2014-059203

(51) Int. Cl.
*B62D 5/04* (2006.01)
*B62D 6/04* (2006.01)

(52) U.S. Cl.
CPC ......... *B62D 5/0463* (2013.01); *B62D 5/0466* (2013.01); *B62D 5/0481* (2013.01); *B62D 6/04* (2013.01)

(58) Field of Classification Search
None
See application file for complete search history.

(56) References Cited

U.S. PATENT DOCUMENTS 7,913,804 B2    3/2011   Ehara et al.
2003/0069675 A1  4/2003   Kifuku et al.
(Continued)

FOREIGN PATENT DOCUMENTS

DE    102012219260 A1   5/2013
JP       5-85379 A      4/1993
(Continued)

OTHER PUBLICATIONS

Communication dated Jul. 28, 2016 from U.S. Patent & Trademark Office in U.S. Appl. No. 14/432,086.

(Continued)

*Primary Examiner* — John R Olszewski
*Assistant Examiner* — David Merlino
(74) *Attorney, Agent, or Firm* — Sughrue Mion, PLLC

(57) ABSTRACT

A steering intention determination device includes a calculation unit that calculates a value based on the product of a steering angular velocity and a steering torque and the product of a steering angle and the time differential value of the steering torque, and a determination unit that determines that the driver has a turn-and-steer steering intention in a case where the value is equal to or greater than a predetermined value, determine that the driver has a steering holding intention in a case where the value is less than the predetermined value and the absolute value of the steering angular velocity is less than a predetermined angular velocity, and determine that the driver has a switchback steering intention in a case where the value is less than the predetermined value and the absolute value of the steering angular velocity is equal to or greater than the predetermined angular velocity.

10 Claims, 24 Drawing Sheets

(56) References Cited

U.S. PATENT DOCUMENTS

| | | | |
|---|---|---|---|
| 2004/0140788 A1* | 7/2004 | Tamaizumi | B62D 5/0463 318/632 |
| 2006/0086560 A1* | 4/2006 | Furusho | B62D 5/0463 180/446 |
| 2007/0062755 A1 | 3/2007 | Krieger et al. | |
| 2009/0266641 A1 | 10/2009 | Ehara et al. | |
| 2012/0029774 A1* | 2/2012 | Fehlings | B62D 5/0481 701/42 |
| 2013/0151079 A1* | 6/2013 | Sworn | B62D 5/0463 701/42 |
| 2014/0180544 A1* | 6/2014 | Itamoto | B62D 5/0463 701/41 |
| 2014/0222295 A1* | 8/2014 | Dornhege | B62D 6/002 701/42 |
| 2015/0239495 A1* | 8/2015 | Kameda | B62D 5/0469 701/41 |
| 2015/0266501 A1* | 9/2015 | Kojo | B62D 5/0463 701/41 |
| 2015/0266504 A1 | 9/2015 | Kunihiro et al. | |
| 2015/0274201 A1 | 10/2015 | Kunihiro et al. | |
| 2016/0200354 A1* | 7/2016 | Kimura | B62D 5/0463 701/42 |

FOREIGN PATENT DOCUMENTS

| | | | |
|---|---|---|---|
| JP | 5208684 A | | 8/1993 |
| JP | 06-219312 A | | 8/1994 |
| JP | 7-40756 A | | 2/1995 |
| JP | 8-99647 A | | 4/1996 |
| JP | 2004-175122 A | | 6/2004 |
| JP | 2005-88754 A | | 4/2005 |
| JP | 2009-262652 A | | 11/2009 |
| JP | 2009262622 A | * | 11/2009 |
| JP | 2012-126359 A | | 7/2012 |
| JP | 2013112119 A | * | 6/2013 |
| KR | 100651144 B1 | | 11/2006 |
| WO | 2014/087546 A1 | | 6/2014 |

OTHER PUBLICATIONS

Communication dated Feb. 13, 2017, from U.S. Appl. No. 14/432,086.

Communication dated Mar. 9, 2017 from U.S. Appl. No. 14/432,086.

* cited by examiner

STEERING INTENTION DETERMINATION DEVICE, VEHICLE CONTROL DEVICE, STEERING ASSIST DEVICE, AND STEERING ASSIST SYSTEM

INCORPORATION BY REFERENCE

The disclosure of Japanese Patent Application No. 2014-059203 filed on Mar. 20, 2014 including the specification, drawings and abstract is incorporated herein by reference in its entirety.

BACKGROUND OF THE INVENTION

1. Field of the Invention

The invention relates to a steering intention determination device that determines a driver's steering intention and a vehicle control device that performs control on a vehicle side based on the driver's steering intention.

2. Description of Related Art

In the related art, techniques for performing control on a vehicle side based on a driver's steering state (turn-and-steer steering state, switchback steering state, or steering holding state) that is determined are known. For example, Japanese Patent Application Publication No. 2004-175122 below discloses a technique for determining the driver's steering state with respect to a steering wheel in accordance with a power that is obtained by integrating the product of the time differential value (steering angular velocity) of a steering angle and a steering torque during a steering operation and performing steering control by using the result of the determination. Japanese Patent Application Publication No. 6-219312 below discloses a technique for determining that the driver's steering state is the steering holding state when each of the first order derivative and the second order derivative of the steering torque is equal to or less than a predetermined value.

When the steering operation is performed, the driver has a steering intention (intention for performing turn-and-steer steering, intention for performing switchback steering, or intention for performing steering holding) following the steering state. Accordingly, the driver may feel uncomfortable with the control on the vehicle side that is performed in accordance with the steering state in a case where the timing of change of the steering state which is determined differs from the timing of change of his or her steering intention. It is desirable that the driver's steering intention is accurately determined so as to suppress the discomfort.

SUMMARY OF THE INVENTION

The invention provides a steering intention determination device that is capable of accurately determining a driver's steering intention, a vehicle control device, a steering assist device, and a steering assist system.

A first aspect of the invention relates to a steering intention determination device. The steering intention determination device includes a steering type discrimination value calculation unit configured to calculate a steering type discrimination value showing a driver's steering type with respect to a steering wheel based on the product of a steering angular velocity and a steering torque during the driver's steering operation at the steering wheel and the product of a steering angle and the time differential value of the steering torque during the steering operation, and a steering intention determination unit configured to determine that the driver has a turn-and-steer steering intention in a case where the steering type discrimination value is equal to or greater than a predetermined value, determine that the driver has a steering holding intention in a case where the steering type discrimination value is less than the predetermined value and the absolute value of the steering angular velocity is less than a predetermined angular velocity, and determine that the driver has a switchback steering intention in a case where the steering type discrimination value is less than the predetermined value and the absolute value of the steering angular velocity is equal to or greater than the predetermined angular velocity.

A second aspect of the invention relates to a vehicle control device. The vehicle control device includes a steering type discrimination value calculation unit configured to calculate a steering type discrimination value showing a driver's steering type with respect to a steering wheel based on the product of a steering angular velocity and a steering torque during the driver's steering operation at the steering wheel and the product a steering angle and of the time differential value of the steering torque during the steering operation, a steering intention determination unit configured to determine that the driver has a turn-and-steer steering intention in a case where the steering type discrimination value is equal to or greater than a predetermined value, determine that the driver has a steering holding intention in a case where the steering type discrimination value is less than the predetermined value and the absolute value of the steering angular velocity is less than a predetermined angular velocity, and determine that the driver has a switchback steering intention in a case where the steering type discrimination value is less than the predetermined value and the absolute value of the steering angular velocity is equal to or greater than the predetermined angular velocity, and a vehicle control unit configured to perform control on a vehicle side based on the driver's steering intention determined.

A third aspect of the invention relates to a steering assist device. The steering assist device includes an ECU configured to calculate a discrimination value based on the product of a steering angular velocity of a steering wheel and a steering torque relating to the steering wheel and the product of a steering angle of the steering wheel and the time differential value of the steering torque relating to the steering wheel and calculate an assist torque based on the discrimination value, and a steering assist unit configured to assist the steering wheel based on the assist torque.

A fourth aspect of the invention relates to a steering assist system. The steering assist system includes an ECU that includes (i) a calculation unit configured to calculate a discrimination value based on the product of a steering angular velocity of a steering wheel and a steering torque relating to the steering wheel and the product of a steering angle of the steering wheel and the time differential value of the steering torque relating to the steering wheel and (ii) a steering determination unit configured to determine a steering type based on the discrimination value, and a device configured to perform control on a vehicle side based on the steering type determined by the steering determination unit, in which the steering type includes a first steering type in which the steering wheel is turned and steered, a second steering type in which the steering angle of the steering wheel is held, and a third steering type in which the steering wheel is switched back, and the steering determination unit determines that the steering type is the first steering type in a case where the discrimination value is equal to or greater than a predetermined value, determines that the steering type is the second steering type in a case where the discrimination value is less than the predetermined value and the absolute value of the steering angular velocity is less than a predetermined value, and determines that the steering type is the third steering type in a case where the discrimination value is less than the predetermined value and the absolute value of the steering angular velocity is equal to or greater than the predetermined value.

According to the above-described aspects, the steering intention determination device that is capable of accurately determining the driver's steering intention, the vehicle control device, the steering assist device, and the steering assist system can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of a steering intention determination device and a vehicle control device according to the invention will be described in detail with reference to accompanying drawings. The invention is not limited to the embodiments.

[Embodiment] The embodiments of the steering intention determination device and the vehicle control device according to the invention will be described based on FIGS. 1 to 24.

Figure 1:
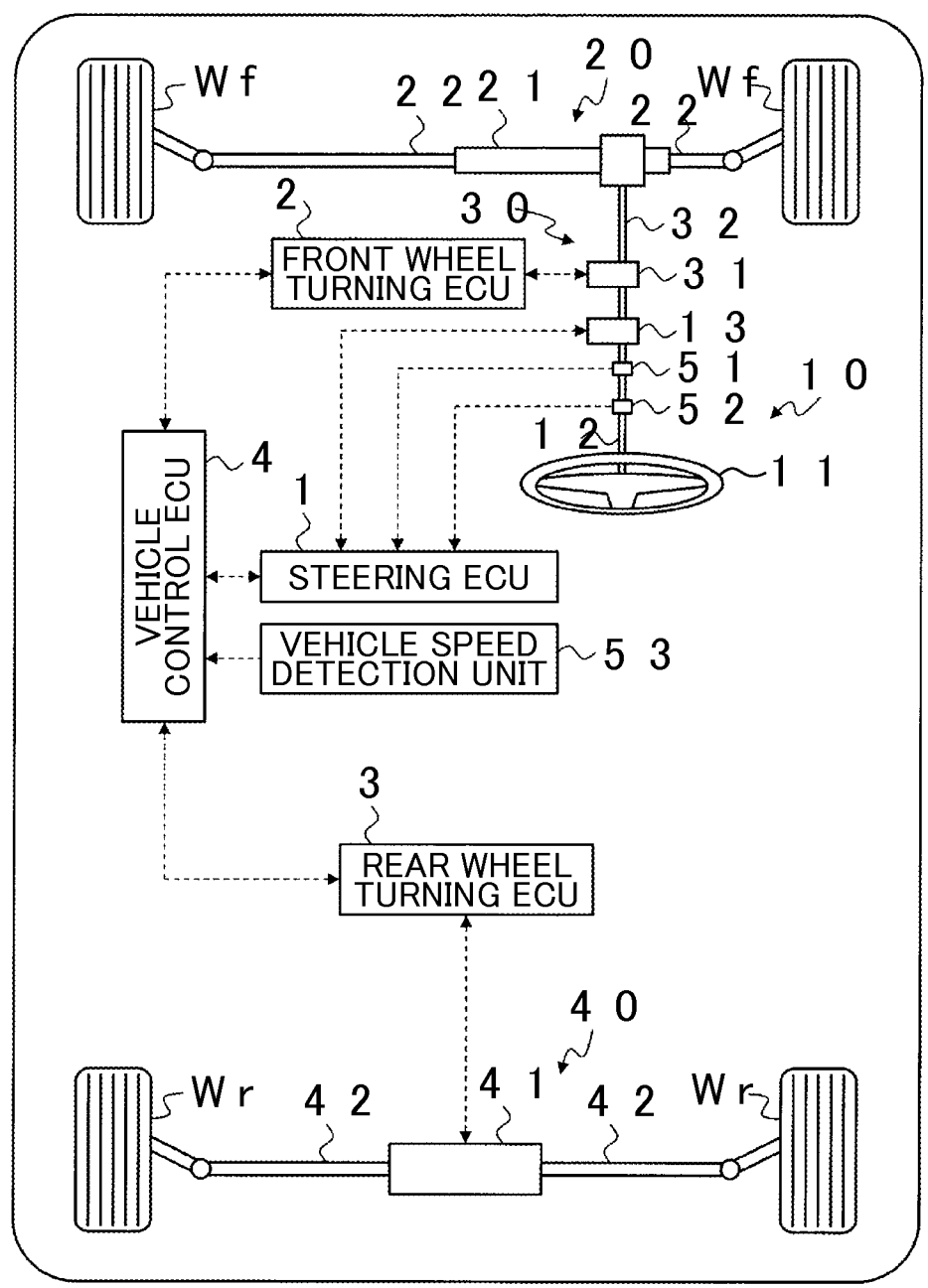
FIG. 1 is a diagram illustrating an example of a vehicle to which a steering intention determination device and a vehicle control device according to the invention are applied.

An example of a vehicle to which the steering intention determination device and the vehicle control device are applied will be described first. As illustrated in FIG. 1, the vehicle is provided with a steering ECU 1, a front wheel turning ECU 2, a rear wheel turning ECU 3, and a vehicle control ECU 4. The steering ECU 1 is an electronic control device that performs computation processing relating to control of a steering device 10. The front wheel turning ECU 2 is an electronic control device that performs computation processing relating to control of a front wheel steering angle variable device 30 which is arranged between the steering device 10 and a front wheel turning device 20. The rear wheel turning ECU 3 is an electronic control device that performs computation processing relating to control of a rear wheel turning device 40. The vehicle control ECU 4 is an electronic control device that performs overall computation processing in the vehicle.

The steering device 10 is a device that is used when a driver turns turning wheels of the vehicle. The steering device 10 is provided with a steering wheel 11 and a rotating shaft (hereinafter, referred to as a "steering shaft") 12 that is connected to the steering wheel 11.

The steering device 10 according to this embodiment is configured as an electric power steering (EPS) device that assists in the driver's steering operation. Accordingly, the steering device 10 can carry out assist control for reducing the driver's steering wheel 11 operating force by allowing an assist torque to act on the steering shaft 12 during the steering operation.

When the assist control is performed, various types of compensation control are carried out so as to give the driver an appropriate steering sensation. Examples of the compensation control include damping control, friction control, and return control. The damping control is control for compensating for turning of the steering wheel 11 and for compensating for a responsive sensation (return sensation) during the steering operation by suppressing a steering angular velocity $\theta s'$ of the steering wheel 11 by using a damping torque (compensation torque). The friction control is control for compensating for friction by using a friction torque (compensation torque) so as to suppress a deterioration of the steering sensation attributable to friction at, for example, a sliding part of the steering device 10. The return control is control for smoothly returning the steering wheel 11 to a neutral position (steering angle $\theta s=0$) by using a return torque (compensation torque).

In the steering device 10, the assist control is carried out with, for example, each of the compensation torques being superimposed on a reference torque and this being set as a target value of the assist torque (hereinafter, referred to as a "target assist torque"). An assist torque calculation unit that calculates the target assist torque is disposed in the steering ECU 1.

When the assist control is performed, the assist torque is generated by a steering assist unit 13. The steering assist unit 13, which is disposed as an actuator of the steering device 10, is provided with, for example, an electric motor and a decelerator (not illustrated). The decelerator has, for example, a plurality of gears, and one of the gears is fixed to the concentric steering shaft 12 and the other gear is fixed to an output shaft of the electric motor. The steering assist unit 13 generates the assist torque in the steering shaft 12 by transmitting an output torque of the electric motor to the steering shaft 12 via the decelerator. An operation of the electric motor is controlled by an assist control unit of the steering ECU 1.

The front wheel turning device 20 turns front wheels Wf as the turning wheels at a turning angle (hereinafter, referred to as a "front wheel steering angle") $\theta wf$ corresponding to a rotation angle of an output shaft 32 (described later) of the front wheel steering angle variable device 30. The output shaft 32 is connected to the steering shaft 12 via a gear ratio variable unit 31 (described later). The front wheel turning device 20 is provided with a gear mechanism 21 that converts a rotation torque transmitted from the output shaft 32 into a turning force (axial force). The gear mechanism 21 is, for example, a so-called rack-and-pinion mechanism that has a rack gear and a pinion gear (not illustrated). The gear mechanism 21 turns the front wheels Wf by transmitting the turning force to the front wheels Wf via respective right and left tie rods 22.

The front wheel steering angle variable device 30 is a device that changes a turning characteristic of the front wheel Wf with respect to the amount of change of the steering angle $\theta s$ of the steering wheel 11, and is disposed, for example, in a so-called variable gear ratio steering (VGRS) system. Specifically, the front wheel steering angle variable device 30 is a device that can adjust the amount of change of the front wheel steering angle $\theta wf$ with respect to the amount of change of the steering angle $\theta s$. The front wheel steering angle variable device 30 can change the amount of change of a turning state quantity of the vehicle with respect to the amount of change of the steering angle $\theta s$ by using the change of the turning characteristic of the front wheel Wf. The turning state quantity is, for example, a yaw rate $\gamma$ that is generated in a vehicle body and a vehicle body slip angle $\beta$.

The gear ratio variable unit 31 that changes a steering gear ratio ($\theta s/\theta wf$) between the steering wheel 11 and the front wheel Wf is disposed in the front wheel steering angle variable device 30. The gear ratio variable unit 31 changes the steering gear ratio by changing the rotation angle of the output shaft 32 with respect to a rotation angle (steering angle $\theta s$) of the steering shaft 12. The output shaft 32 is connected to the gear mechanism 21 of the front wheel turning device 20. The gear ratio variable unit 31 is provided with, for example, an electric motor and a gear group (not illustrated), and connects the steering shaft 12 to the output shaft 32 via the gear group. A front wheel turning characteristic control unit is disposed in the front wheel turning ECU 2. The front wheel turning characteristic control unit changes the steering gear ratio by controlling the electric motor of the gear ratio variable unit 31 and performs control on the turning characteristic of the front wheel Wf (hereinafter, referred to as "front wheel turning characteristic control") with respect to the amount of change of the steering angle $\theta s$.

Herein, the front wheel turning characteristic control unit can increase the increment of the turning state quantity with respect to the increment of the steering angle $\theta s$ and control a steer characteristic (turning characteristic) of the vehicle onto an oversteer side by increasing the increment of the front wheel steering angle $\theta wf$ with respect to the increment of the steering angle $\theta s$ more during turn-and-steer steering than, for example, at the time of a neutral steer state. The front wheel turning characteristic control unit can decrease the increment of the turning state quantity with respect to the increment of the steering angle $\theta s$ and control the steer characteristic of the vehicle onto an understeer side by decreasing the increment of the front wheel steering angle $\theta wf$ with respect to the increment of the steering angle $\theta s$ more during the turn-and-steer steering than at the time of the neutral steer state. Accordingly, it can be said that the front wheel turning characteristic control unit functions as a steer characteristic control unit that controls the steer characteristic of the vehicle.

A front wheel turning characteristic calculation unit that calculates a target amount of change of the front wheel steering angle $\theta wf$ (that is, a target steering gear ratio) with respect to the amount of change of the steering angle $\theta s$ is disposed in the front wheel turning ECU 2. The target steering gear ratio is determined based on a target amount of change of the turning state quantity with respect to the amount of change of the steering angle $\theta s$. In this embodiment, the target amount of change of the turning state quantity with respect to the amount of change of the steering angle $\theta s$ is calculated by a turning characteristic calculation unit of the vehicle control ECU 4. Accordingly, the front wheel turning characteristic calculation unit can perform the calculation of the target steering gear ratio based on, for example, information on the target amount of change of the turning state quantity with respect to the amount of change of the steering angle $\theta s$ received from the vehicle control ECU 4.

Herein, a steering operation for increasing the steering angle $\theta s$ to any one of the right and the left from the neutral position (steering angle $\theta s=0$) of the steering wheel 11 will be referred to as the turn-and-steer steering and a steering operation for decreasing the steering angle $\theta s$ toward the neutral position from the turn-and-steer state will be referred to as switchback steering. Also, herein, the turn-and-steer state and a state where the steering wheel 11 is held at the neutral position will be referred to as steering holding.

Herein, the change of the front wheel turning characteristic (steer characteristic of the vehicle) may be performed by changing a gain of the front wheel steering angle θwf with respect to the steering angle θs. In addition, the change of the front wheel turning characteristic (steer characteristic of the vehicle) may be performed by changing a differential steer gain (described later) with respect to the steering angle θs. In addition, the change of the front wheel turning characteristic (steer characteristic of the vehicle) may be performed by changing a damping control amount of the front wheel steering angle θwf with respect to the steering angle θs.

The rear wheel turning device 40 is a device that can turn rear wheels Wr as the turning wheels. For example, the rear wheel turning device 40 is a device that is disposed in a so-called rear wheel steering (active rear steer (ARS) and dynamic rear steering (DRS)) system and the like. The rear wheel turning device 40 is provided with a turning force generating mechanism 41 that generates a turning force (axial force). The turning force generating mechanism 41 is provided with, for example, an electric motor and a gear group (not illustrated), and turns the rear wheels Wr by transmitting the turning force (axial force) generated by using power of the electric motor to the rear wheels Wr via respective right and left tie rods 42. In addition, the turning force generating mechanism 41 can switch a turning direction of the rear wheel Wr into the same phase or opposite phase with respect to a turning direction of the front wheel Wf. A rear wheel turning control unit is disposed in the rear wheel turning ECU 3. The rear wheel turning control unit performs turning control on the rear wheels Wr (hereinafter, referred to as "rear wheel turning control") by controlling the electric motor of the turning force generating mechanism 41.

In the vehicle, both the front wheels Wf and the rear wheels Wr are turned, and thus the amount of change of the turning state quantity with respect to the amount of change of the steering angle θs can be changed compared to when only the front wheels Wf are turned. For example, the rear wheel turning control unit can control the steer characteristic of the vehicle onto the oversteer side by turning the rear wheels Wr for the opposite phase with respect to the turning direction of the front wheel Wf. In addition, the rear wheel turning control unit can control the steer characteristic of the vehicle onto the understeer side by turning the rear wheels Wr for the same phase with respect to the turning direction of the front wheel Wf. Accordingly, it can be said that the rear wheel turning control unit functions as a steer characteristic control unit that controls the steer characteristic of the vehicle.

A rear wheel control amount calculation unit that calculates a target rear wheel steering angle θwrt (including a phase direction) is disposed in the rear wheel turning ECU 3. The target rear wheel steering angle θwrt is determined based on the target amount of change of the turning state quantity with respect to the amount of change of the steering angle θs. Accordingly, the rear wheel control amount calculation unit can perform the calculation of the target rear wheel steering angle θwrt based on the target amount of change of the turning state quantity with respect to the amount of change of the steering angle θs received from the vehicle control ECU 4.

Herein, the change of the steer characteristic of the vehicle may be performed by changing a gain of a rear wheel steering angle θwr with respect to the steering angle θs. In addition, the change of the steer characteristic may be performed by changing a differential gain (described later) with respect to the steering angle θs.

In the vehicle, the target steering gear ratio and the target rear wheel steering angle θwrt are calculated based on the target amount of change of the turning state quantity with respect to the amount of change of the steering angle θs and the amount of change of the turning state quantity with respect to the amount of change of the steering angle θs can be changed by using the control of the steering gear ratio and the control of the rear wheel steering angle θwr and the phase direction of the rear wheel Wr in combination with each other.

In the assist control of the steering device 10 described above, the driver may feel an uncomfortable steering sensation unless an intention (hereinafter, referred to as a "steering intention") shown in the driver's steering states is accurately reflected. In addition, the control of the steer characteristic of the vehicle by the front wheel steering angle variable device 30 and the rear wheel turning device 40 may result in a vehicle behavior the driver feels uncomfortable with unless the driver steering intention is reflected with high responsiveness and accuracy. Accordingly, it is desirable that the driver's steering intention is accurately apprehended in order to eliminate or reduce the discomfort. The vehicle control device according to this embodiment is provided with the steering intention determination device that determines the driver's steering intention.

The driver's steering states refer to a turn-and-steer steering state, a switchback steering state, and a steering holding state. Accordingly, the driver's steering intention is broadly divided into an intention for performing the turn-and-steer steering (hereinafter, referred to as a "turn-and-steer steering intention"), an intention for performing the switchback steering (hereinafter, referred to as a "switchback steering intention"), and an intention for performing the steering holding (hereinafter, referred to as a "steering holding intention").

In this embodiment, the computation processing relating to the steering intention determination device is carried out by the steering ECU 1. A steering type determination unit that determines the driver's steering type and a steering intention determination unit that determines the driver's steering intention are disposed in the steering ECU 1.

The driver's steering type can be broadly divided into two types, one being active steering and the other being passive steering.

The active steering is an aggressive (active) steering operation that is purposefully performed by the driver. Specifically, the turn-and-steer steering corresponds to the active steering.

The passive steering is a steering type other than the active steering. Specifically, the passive steering is the steering holding that is performed by the driver when an external force such as a restoring force attributable to a self-aligning torque of the front wheel Wf and a road surface input is transmitted to the steering wheel 11. In other words, the passive steering is the steering holding that is performed so as to hold the steering angle θs constant during turning (turning radius not changing) and the steering holding that is performed to hold a straight driving state at the neutral position of the steering wheel 11. In addition, the passive steering includes the steering holding at the neutral position of the steering wheel 11 in a state where the external force is not transmitted. The passive steering also includes the switchback steering that is performed by the driver in reliance upon the restoring force of the self-aligning torque.

The steering type determination unit can determine whether the driver's steering type is the active steering or the passive steering based on a value relating to a power P of the steering operation (hereinafter, referred to as a "steering power"). The steering power P is a steering type discrimination value that shows the driver's steering type with respect to the steering wheel 11, and is calculated based on a parameter relating to the steering angle θs and a parameter relating to a steering torque Ts during the steering operation. The parameter relating to the steering angle θs refers to the steering angle θs itself and the steering angular velocity θs' that is the time differential value of the steering angle θs. The parameter relating to the steering torque Ts refers to the steering torque Ts itself and the time differential value Ts' of the steering torque Ts (hereinafter, referred to as a "steering torque differential value").

Figure 2:
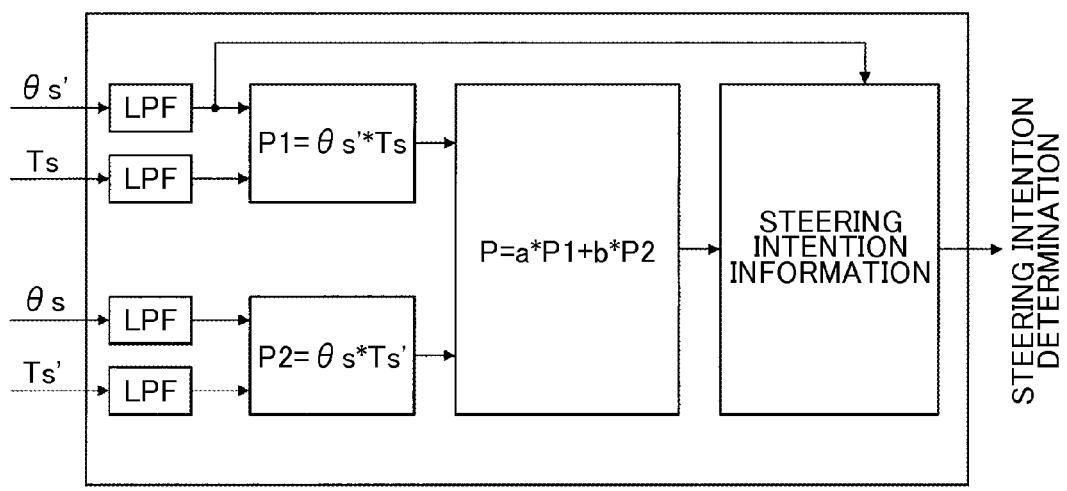
FIG. 2 is a block diagram showing steering intention determination.

As illustrated in FIG. 2 and the following Equations 1 to 3, the steering power P is calculated by using a first steering power P1 and a second steering power P2. The first steering power P1 is the product of the steering angular velocity θs' and the steering torque Ts during the steering operation. The second steering power P2 is the product of the steering angle θs and the steering torque differential value Ts' during the steering operation. The "a" and "b" in the Equation 3 are coefficients. In other words, the steering power P is calculated based on the product of the steering angular velocity θs' and the steering torque Ts during the steering operation and the product of the steering angle θs and the steering torque differential value Ts' during the steering operation. A steering power calculation unit (steering type discrimination value calculation unit) that calculates the steering power P is disposed in the steering ECU 1.

$$P1 = \theta s' * Ts \qquad (1)$$

$$P2 = \theta s * Ts' \qquad (2)$$

$$P = a*P1 + b*P2 \qquad (3)$$

The steering angle θs is detected by a steering angle detection unit 51. The steering angle detection unit 51 is an angle sensor that detects the rotation angle of the steering shaft 12 as the steering angle θs. The steering angle detection unit 51 can detect the direction of the steering angle θs with respect to the neutral position of the steering wheel 11 as well as the steering angle θs. The steering angular velocity θs' may be obtained as the time differential value of the steering angle θs that is detected by the steering angle detection unit 51 and may be detected by using a steering angular velocity detection unit (not illustrated). The steering torque Ts is detected by a steering torque detection unit 52. The steering torque detection unit 52 is, for example, a resolver sensor that is arranged on the steering shaft 12 and can detect not only the magnitude of the torque but also the direction of the torque with respect to the neutral position of the steering wheel 11.

The steering type determination unit can determine the steering as the active steering in a case where, for example, the steering power P is equal to or greater than a predetermined value P0 and can determine the steering as the passive steering in a case where, for example, the steering power P is less than the predetermined value P0. The predetermined value P0 may be set based on a previously performed experiment or simulation.

Accordingly, it can be determined that the driver's steering state is the turn-and-steer steering state in a case where the steering power P is equal to or greater than the predetermined value P0, and thus it can be determined that the driver's steering intention is the turn-and-steer steering intention. Accordingly, the steering intention determination unit can determine that the driver has the turn-and-steer steering intention in a case where the steering power P is equal to or greater than the predetermined value P0.

In a case where the steering power P is less than the predetermined value P0, the driver's steering state is determined to be any one of the switchback steering state and the steering holding state, and thus it is determined that the driver's steering intention is any one of the switchback steering intention and the steering holding intention. However, with the steering power P alone, it cannot be determined whether the driver's steering intention is the switchback steering intention or the steering holding intention. Herein, it can be determined to a certain extent whether the driver's steering intention is the switchback steering intention or the steering holding intention in a case where the steering power P is used in combination with, for example, information on the steering angle θs. During this determination, however, it is difficult to accurately determine the steering intention at each timing of the steering operation on a case-by-case basis.

The steering intention determination unit accurately determines the driver's steering intention during the passive steering by using the steering angular velocity θs' during the steering operation as well as the steering power P. Specifically, in a case where the steering power P is less than the predetermined value P0 and the absolute value of the steering angular velocity θs' is less than a predetermined angular velocity θs0', it is determined that the driver has the steering holding intention. In a case where the steering power P is less than a predetermined value P0 and the absolute value of the steering angular velocity θs' is equal to or greater than the predetermined angular velocity θs0', it is determined that the driver has the switchback steering intention. The predetermined angular velocity θs0' may be set based on a previously performed experiment or simulation. In this example, the steering holding is switched into the switchback steering when the absolute value of the steering angular velocity θs' increases and reaches the predetermined angular velocity θs0'.

Figure 3:
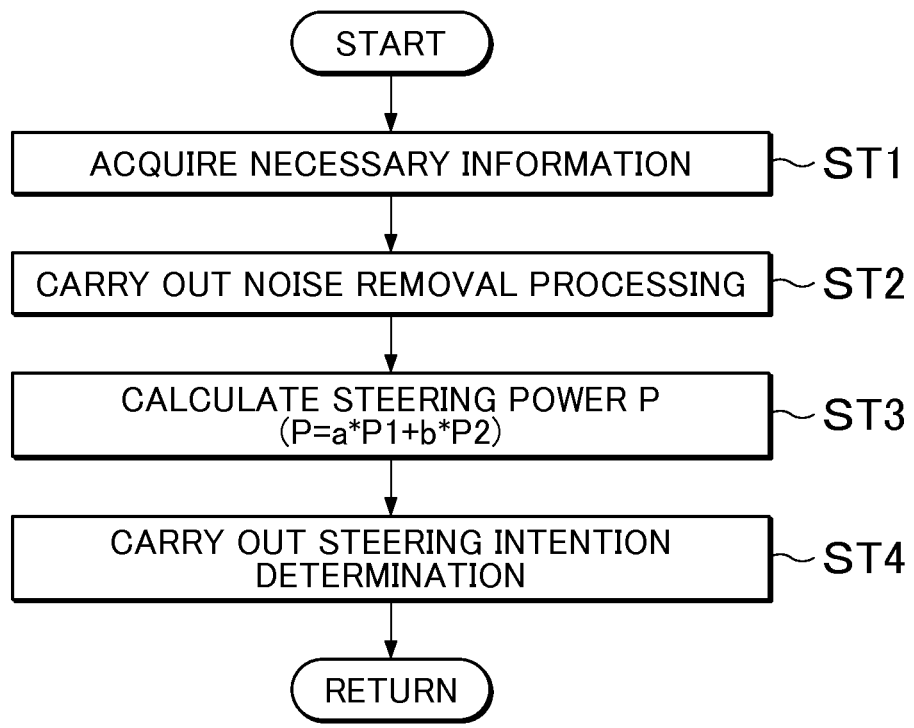
FIG. 3 is a flowchart showing the steering intention determination.

When this steering intention determination is performed, the steering ECU 1 acquires information necessary for the determination as illustrated by the flowchart in FIG. 3 (Step ST1). The necessary information refers to the steering angle θs, the steering angular velocity θs', the steering torque Ts, and the steering torque differential value Ts'.

The steering power calculation unit performs noise removal processing for each of the steering angle θs, the steering angular velocity θs', the steering torque Ts, and the steering torque differential value Ts' (Step ST2). For example, the steering power calculation unit removes noise at the time of, for example, detection by passing the steering angle θs, the steering angular velocity θs', the steering torque Ts, and the steering torque differential value Ts' through a low-pass filter (LPF).

The steering power calculation unit calculates the steering power P based on the noise-removed steering angle θs and the like (Step ST3). Then, the steering intention determination unit determines the driver's steering intention based on the steering power P and the steering angular velocity θs' (Step ST4).

It is desirable that the computation processing relating to this steering intention determination is repeatedly carried out during at least the traveling of the vehicle. In other words, it is desirable that the driver's steering intention is continuously determined during at least the traveling of the vehicle.

If the predetermined value P0 is set so that the active steering is determined in a case where the steering power P exceeds the predetermined value P0 and the passive steering is determined in a case where the steering power P is equal to or less than the predetermined value P0, the steering intention determination unit may determine that the driver has the turn-and-steer steering intention in a case where the steering power P exceeds the predetermined value P0. If the predetermined angular velocity $\theta s0'$ is set so that it is determined that the steering holding is switched into the switchback steering when the absolute value of the steering angular velocity $\theta s'$ increases to exceed the predetermined angular velocity $\theta s0'$, the steering intention determination unit may determine that the driver has the steering holding intention in a case where the steering power P is equal to or less than the predetermined value P0 and the absolute value of the steering angular velocity $\theta s'$ is equal to or less than the predetermined angular velocity $\theta s0'$ and may determine that the driver has the switchback steering intention in a case where the steering power P is equal to or less than the predetermined value P0 and the absolute value of the steering angular velocity $\theta s'$ exceeds the predetermined angular velocity $\theta s0'$.

Herein, the steering intention determination unit determines the driver's steering intention into three types, that is, the turn-and-steer steering intention, the steering holding intention, and the switchback steering intention. However, it is desirable that the determination of the steering holding intention is divided into that during straight driving not affected by the restoring force of the self-aligning torque and that during turning affected by the restoring force. The steering intention determination unit is configured to perform this determination as well.

Specifically, the steering intention determination unit more finely determines the driver's steering intention during the steering holding intention by using the steering angle $\theta s$ during the steering operation as well as the steering power P and the steering angular velocity $\theta s'$ during the steering operation. As described above, the steering intention determination unit determines that the driver has the steering holding intention in a case where the steering power P is less than the predetermined value P0 and the absolute value of the steering angular velocity $\theta s'$ is less than the predetermined angular velocity $\theta s0'$. Accordingly, the steering intention determination unit determines that the driver's steering intention is the steering holding intention during the straight driving if the absolute value of the steering angle $\theta s$ is less than a predetermined angle $\theta s0$ and determines that the driver's steering intention is the steering holding intention during the turning if the absolute value of the steering angle $\theta s$ is equal to or greater than the predetermined angle $\theta s0$ in a case where the steering holding intention is determined. The predetermined angle $\theta s0$ corresponds, for example, to a play to any one of the right and the left when the steering wheel 11 is at the neutral position.

An example of the steering intention determination will be described based on the flowchart in FIG. 4.

After the steering power P is calculated (Step 4A), the steering intention determination unit determines whether or not the steering power P exceeds the predetermined value P0 (Step 4B).

In a case where the steering power P exceeds the predetermined value P0, the steering intention determination unit determines that the driver has the turn-and-steer steering intention (Step 4C).

In a case where the steering power P is equal to or less than the predetermined value P0, the steering intention determination unit determines whether or not the absolute value of the steering angular velocity $\theta s'$ is equal to or less than the predetermined angular velocity $\theta s0'$ (Step 4D).

In a case where the absolute value of the steering angular velocity $\theta s'$ is equal to or less than the predetermined angular velocity $\theta s0'$, the steering intention determination unit determines that the driver has the steering holding intention (Step 4E). In a case where the absolute value of the steering angular velocity $\theta s'$ exceeds the predetermined angular velocity $\theta s0'$, the steering intention determination unit determines that the driver has the switchback steering intention (Step 4F).

In a case where the steering holding intention is determined, the steering intention determination unit further determines whether the steering holding intention is that during the straight driving or that during the turning. Accordingly, the steering intention determination unit determines whether or not the absolute value of the steering angle $\theta s$ is less than the predetermined angle $\theta s0$ (Step 4G).

In a case where the absolute value of the steering angle $\theta s$ is less than the predetermined angle $\theta s0$, the steering intention determination unit determines that the steering holding intention is the steering holding intention during the straight driving (Step 4H). In a case where the absolute value of the steering angle $\theta s$ is equal to or greater than the predetermined angle $\theta s0$, the steering intention determination unit determines that the steering holding intention is the steering holding intention during the turning (Step 4I).

Figure 5:
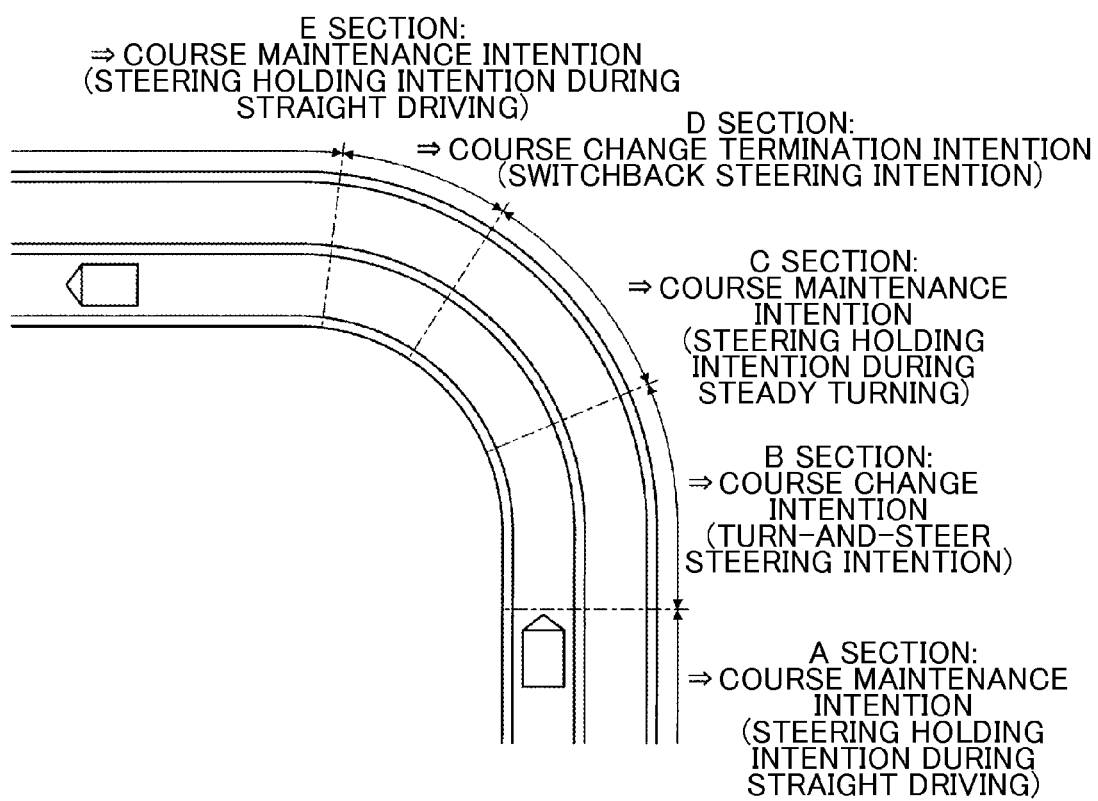
FIG. 5 is a diagram illustrating an example of a transition of a driver's steering intention during a left turn.
Figure 6:
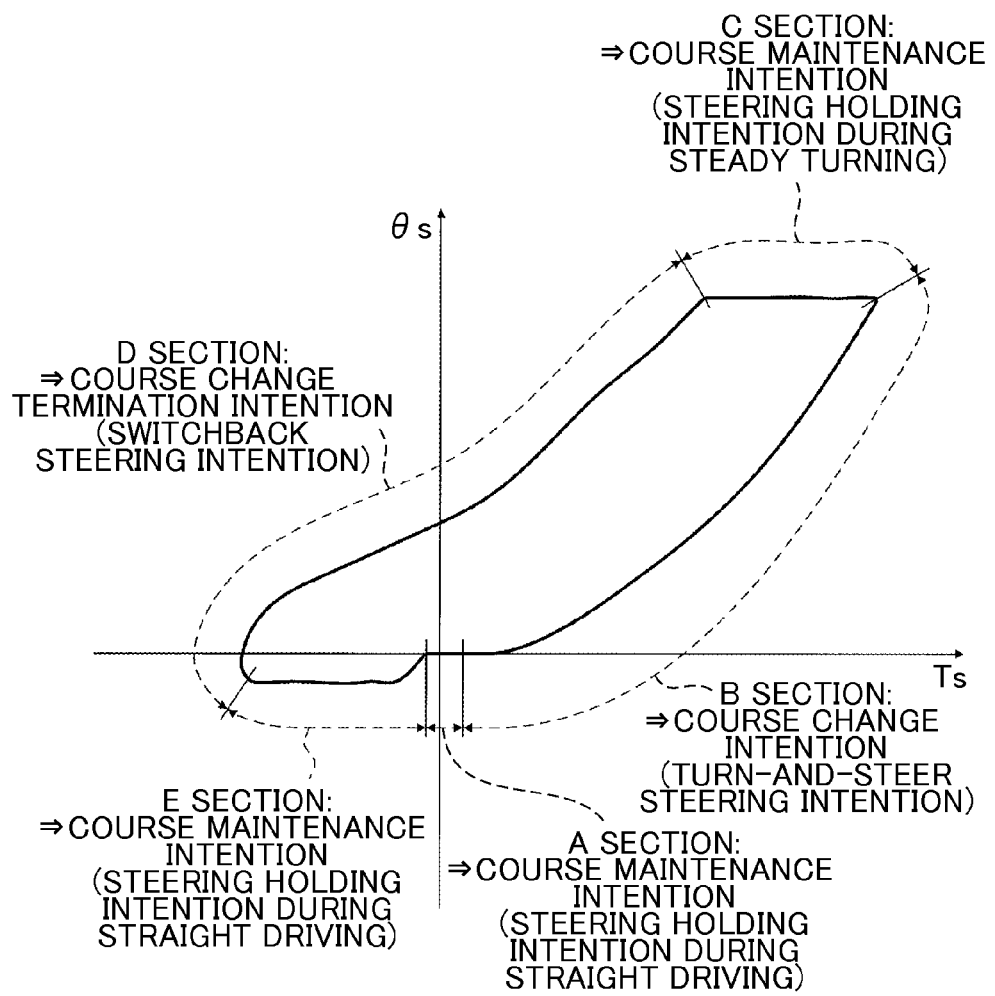
FIG. 6 is a diagram illustrating an example of the transition of the driver's steering intention during the left turn based on a correspondence relationship between a steering torque and a steering angle.

The determination of the steering intention will be described by using a left turn as an example. FIG. 5 illustrates an example of a transition of the driver's steering intention during the left turn. FIG. 6 illustrates the transition based on a correspondence relationship between the steering torque Ts and the steering angle $\theta s$.

In the straight driving state before reaching a left-turning road, the steering power P is less than the predetermined value P0 and the absolute value of the steering angular velocity $\theta s'$ is less than the predetermined angular velocity $\theta s0'$. Accordingly, the steering intention determination unit determines that the driver has the steering holding intention (A section in FIGS. 5 and 6). In this case, the steering intention determination unit can determine that the driver's steering intention is the steering holding intention during the straight driving and the driver has a course maintenance intention during the straight driving since the absolute value of the steering angle $\theta s$ is equal to or less than the predetermined angle $\theta s0$.

When the vehicle initiates a turning operation from the straight driving state, the steering power P becomes equal to or greater than the predetermined value P0. Accordingly, the steering intention determination unit determines that the driver has the turn-and-steer steering intention (B section in FIGS. 5 and 6). In this case, the steering intention determination unit can determine that the driver has a left turn-based course change intention based on, for example, imaging information of an imaging device (not illustrated) that images a space in front of the main vehicle. Depending on the imaging information, it can be determined that the driver has a vehicle lane change intention.

In the middle of the movement of the vehicle on the left-turning road, the steering power P becomes less than the predetermined value P0 and the absolute value of the steering angular velocity $\theta s'$ may become less than the predetermined angular velocity $\theta s0'$. Accordingly, in this case, the steering intention determination unit also determines that the driver has the steering holding intention (C section in FIGS. 5 and 6). In this case, the steering intention determination unit can determine, based on, for example, the imaging information of the imaging device that images the space in front of the main vehicle, that the driver has the course maintenance intention during a steady turning on the left-turning road since the absolute value of the steering angle θs exceeds the predetermined angle θs0.

In the middle of the movement of the vehicle on the left-turning road, the absolute value of the steering angular velocity θs' may become equal to or greater than the predetermined angular velocity θs0' with the steering power P remaining less than the predetermined value P0. Accordingly, in this case, the steering intention determination unit determines that the driver has the switchback steering intention for turning operation termination (D section in FIGS. 5 and 6). In this case, the steering intention determination unit can determine that the driver has a course change termination (turning operation termination) intention based on, for example, the imaging information of the imaging device that images the space in front of the main vehicle.

After the vehicle terminates the turning operation, the absolute value of the steering angular velocity θs' may become less than the predetermined angular velocity θs0' with the steering power P remaining less than the predetermined value P0. Accordingly, in this case, the steering intention determination unit determines that the driver has the steering holding intention (E section in FIGS. 5 and 6). In this case, the steering intention determination unit can determine that the driver's steering state is the steering holding state during the straight driving and the driver has the course maintenance intention during the straight driving after the turning operation termination since the steering angle θs is equal to or less than the predetermined angle θs0.

In this manner, the steering intention determination unit can accurately determine the driver's steering intention in each scene of the steering operation. Accordingly, the steering intention determination unit also can accurately determine the timing of the changes to the driver's different steering intentions. A result of the determination by the steering intention determination unit is output as steering intention information (FIG. 2).

The steering intention determination unit according to this embodiment may calculate the time differential value P' of the steering power P in a case where it is determined that the driver has the turn-and-steer steering intention, may determine that the driver continuously has the turn-and-steer steering intention if the time differential value P' of the steering power P is equal to or greater than a predetermined value P0', and may determine that the driver's turn-and-steer steering intention declines if the time differential value P' becomes less than the predetermined value P0'. In this manner, the steering intention determination unit can apprehend an intention change in the driver's turn-and-steer steering intention.

The steering intention determination unit may calculate the time differential value P' of the steering power P in a case where it is determined that the driver has the switchback steering intention, may determine that the driver continuously has the switchback steering intention if the time differential value P' of the steering power P is equal to or less than the predetermined value P0', and may determine that the driver's switchback steering intention declines if the time differential value P' exceeds the predetermined value P0'. In this manner, the steering intention determination unit can apprehend an intention change in the driver's switchback steering intention.

The assist control unit realizes the steering sensation reflecting the steering intention and the change of the steering intention by carrying out the assist control reflecting the driver's steering intention and change of the steering intention. In addition, the front wheel turning characteristic control unit carries out the control of the steer characteristic of the vehicle reflecting the steering intention and the change of the steering intention by carrying out the front wheel turning characteristic control reflecting the driver's steering intention and change of the steering intention. In addition, the rear wheel turning control unit carries out the control of the steer characteristic of the vehicle reflecting the steering intention and the change of the steering intention by carrying out the rear wheel turning control reflecting the driver's steering intention and change of the steering intention.

Next, the assist control will be described.

Figure 7:
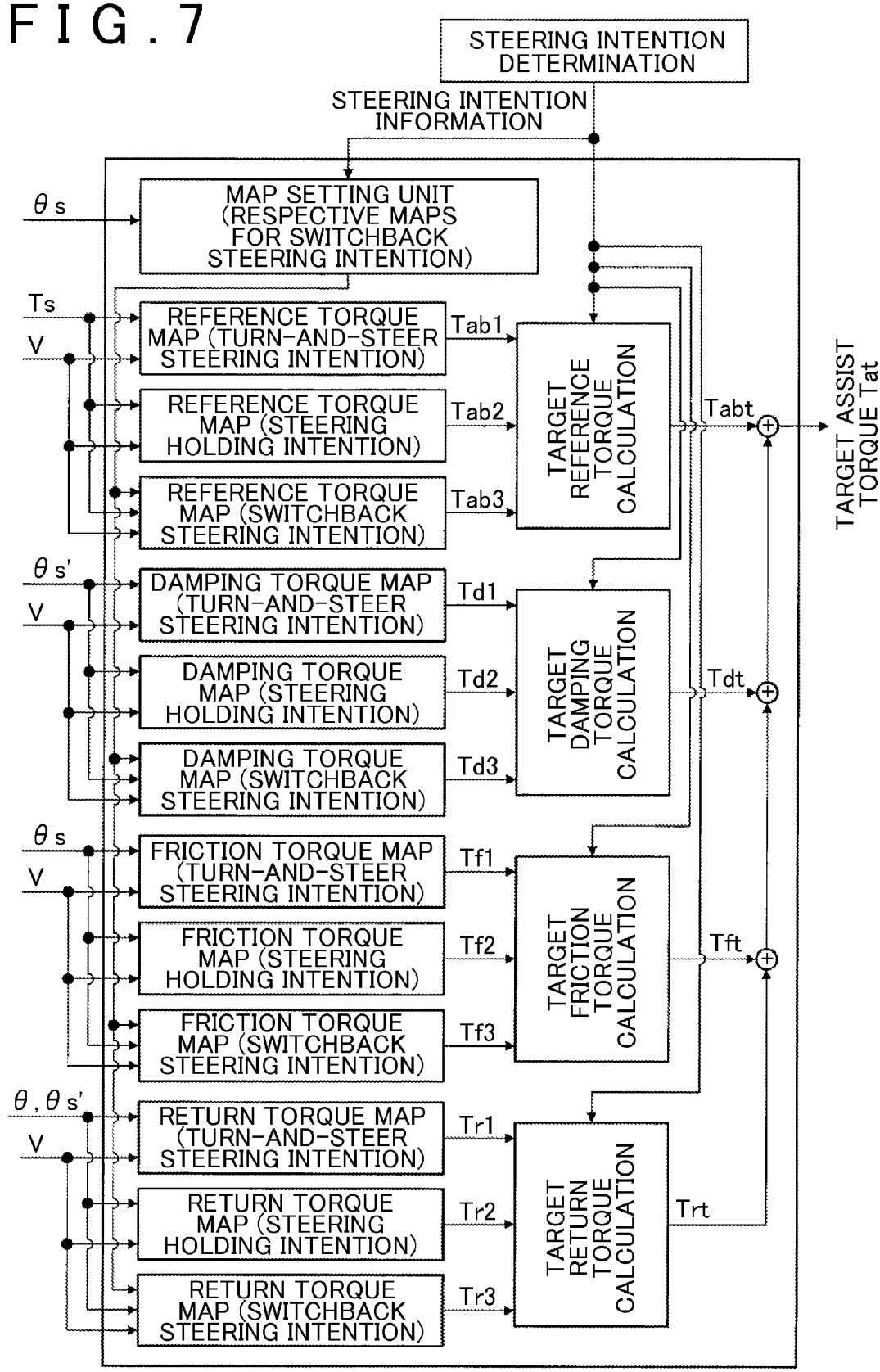
FIG. 7 is a block diagram relating to assist control.
Figure 8:
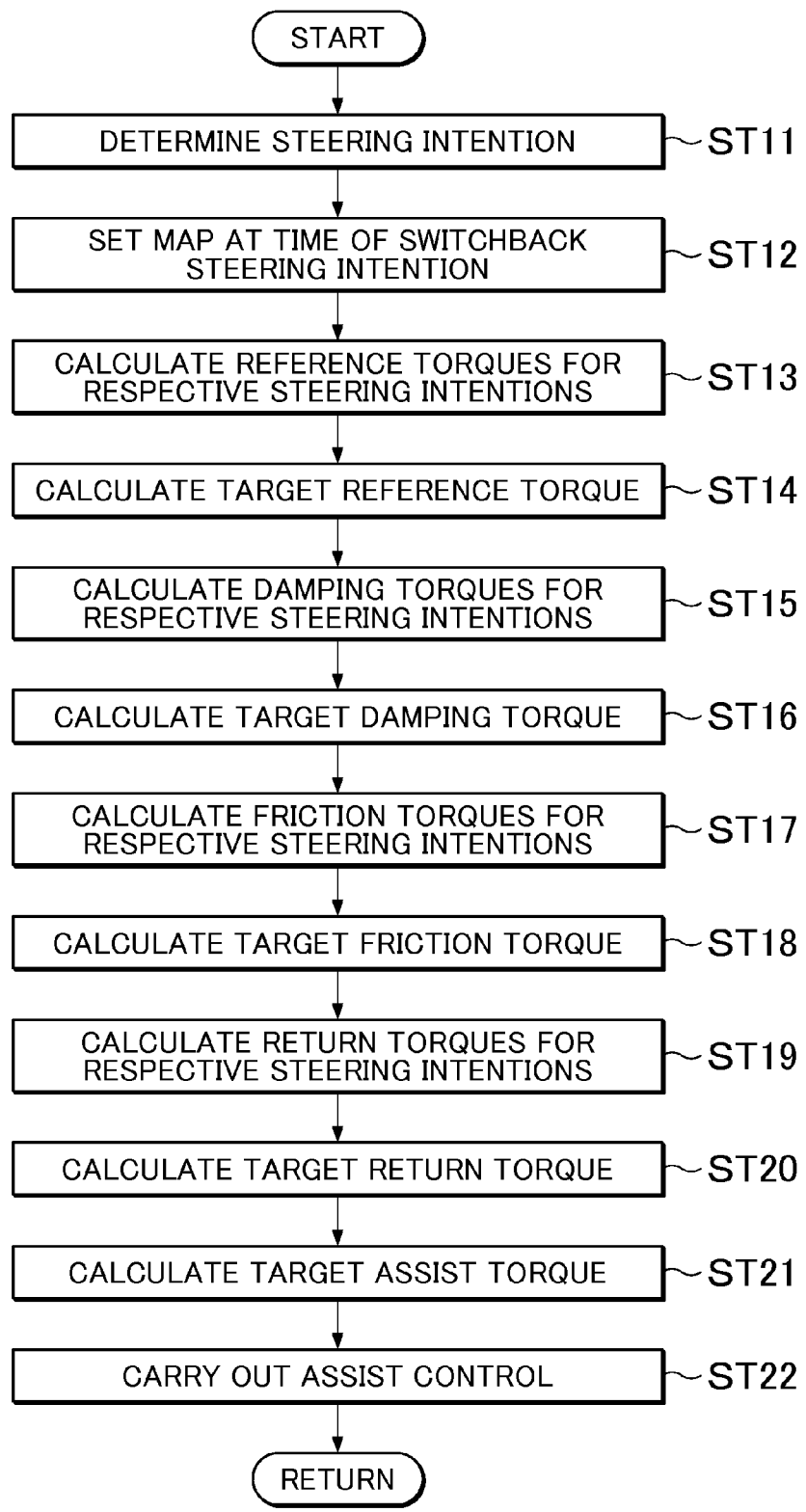
FIG. 8 is a flowchart showing the assist control.

A block diagram relating to the assist control is illustrated in FIG. 7. An example of a flowchart relating to the assist control is illustrated in FIG. 8.

Figure 4:
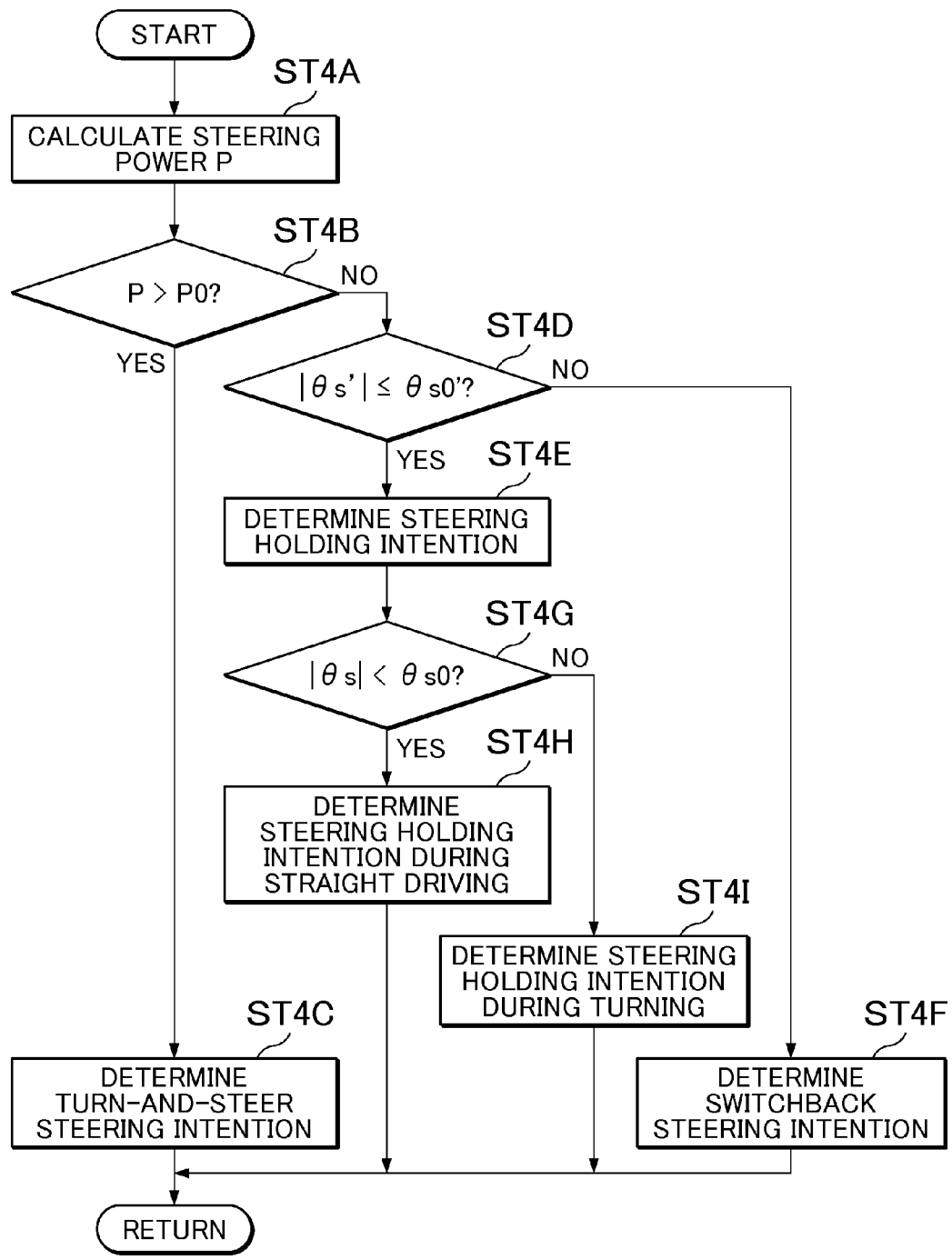
FIG. 4 is a flowchart showing a specific example of the steering intention determination.

After the steering intention determination that is illustrated in FIGS. 3 and 4 is completed (Step ST11), a map setting unit of the steering ECU 1 sets a map at the time of the switchback steering intention based on the result of the determination of the steering intention (steering intention information) and the current steering angle θs (Step ST12).

In Step ST12, a reference torque map at the time of the switchback steering intention, a damping torque map at the time of the switchback steering intention, a friction torque map at the time of the switchback steering intention, and a return torque map at the time of the switchback steering intention are set.

The reference torque map is a map for calculating a reference torque Tab corresponding to the steering torque Ts and the vehicle speed V. The reference torque map includes that at the time of the turn-and-steer steering intention, that at the time of the steering holding intention, and that at the time of the switchback steering intention. In Step ST12, the reference torque map at the time of the switchback steering intention is corrected based on the driver's steering intention. The vehicle speed V is detected by a vehicle speed detection unit 53. For example, a rotation sensor that detects the rotation of an output shaft of a transmission of a power transmission device (not illustrated), a vehicle wheel speed sensor that detects a vehicle wheel speed, or the like is used as the vehicle speed detection unit 53.

The damping torque map is a map for calculating a damping torque Td corresponding to the steering angular velocity θs' and the vehicle speed V. The damping torque map includes that at the time of the turn-and-steer steering intention, that at the time of the steering holding intention, and that at the time of the switchback steering intention. In Step ST12, the damping torque map at the time of the switchback steering intention is corrected based on the driver's steering intention.

The friction torque map is a map for calculating a friction torque Tf corresponding to the steering angle θs and the vehicle speed V. The friction torque map includes that at the time of the turn-and-steer steering intention, that at the time of the steering holding intention, and that at the time of the switchback steering intention. In Step ST12, the friction torque map at the time of the switchback steering intention is corrected based on the driver's steering intention.

The return torque map is a map for calculating a return torque Tr corresponding to the steering angle θs, the steering angular velocity θs', and the vehicle speed V. The return torque map includes that at the time of the turn-and-steer steering intention, that at the time of the steering holding intention, and that at the time of the switchback steering intention. In Step ST12, the return torque map at the time of the switchback steering intention is corrected based on the driver's steering intention.

The assist torque calculation unit calculates the respective reference torques Tab1, Tab2, Tab3 from the reference torque maps for the respective steering intentions based on the steering torque Ts and the vehicle speed V (Step ST13). Herein, the reference torque Tab1 at the time of the turn-and-steer steering intention, the reference torque Tab2 at the time of the steering holding intention, and the reference torque Tab3 at the time of the switchback steering intention are calculated.

The assist torque calculation unit calculates a target reference torque Tabt based on the respective reference torques Tab1, Tab2, Tab3 and the result of the determination of the steering intention (steering intention information) (Step ST14). In other words, the target reference torque Tabt reflecting the driver's steering intention is calculated herein.

In addition, the assist torque calculation unit calculates the respective damping torques Td1, Td2, Td3 from the damping torque maps for the respective steering intentions based on the steering angular velocity $\theta s'$ and the vehicle speed V (Step ST15). Herein, the damping torque Td1 at the time of the turn-and-steer steering intention, the damping torque Td2 at the time of the steering holding intention, and the damping torque Td3 at the time of the switchback steering intention are calculated.

The assist torque calculation unit calculates a target damping torque Tdt based on the respective damping torques Td1, Td2, Td3 and the result of the determination of the steering intention (steering intention information) (Step ST16). In other words, the target damping torque Tdt reflecting the driver's steering intention is calculated herein.

In addition, the assist torque calculation unit calculates the respective friction torques Tf1, Tf2, Tf3 from the friction torque maps for the respective steering intentions based on the steering angle $\theta s$ and the vehicle speed V (Step ST17). Herein, the friction torque Tf1 at the time of the turn-and-steer steering intention, the friction torque Tf2 at the time of the steering holding intention, and the friction torque Tf3 at the time of the switchback steering intention are calculated.

The assist torque calculation unit calculates a target friction torque Tft based on the respective friction torques Tf1, Tf2, Tf3 and the result of the determination of the steering intention (steering intention information) (Step ST18). In other words, the target friction torque Tft reflecting the driver's steering intention is calculated herein.

In addition, the assist torque calculation unit calculates the respective return torques Tr1, Tr2, Tr3 from the return torque maps for the respective steering intentions based on the steering angle $\theta s$, the steering angular velocity $\theta s'$, and the vehicle speed V (Step ST19). Herein, the return torque Tr1 at the time of the turn-and-steer steering intention, the return torque Tr2 at the time of the steering holding intention, and the return torque Tr3 at the time of the switchback steering intention are calculated.

The assist torque calculation unit calculates a target return torque Trt based on the respective return torques Tr1, Tr2, Tr3 and the result of the determination of the steering intention (steering intention information) (Step ST20). In other words, the target return torque Trt reflecting the driver's steering intention is calculated herein.

The assist torque calculation unit calculates a target assist torque Tat by adding the target reference torque Tabt, the target damping torque Tdt, the target friction torque Tft, and the target return torque Trt (Step ST21).

The assist control unit carries out the assist control by controlling the steering assist unit 13 for the target assist torque Tat (Step ST22). In other words, the steering assist unit 13 assists the steering wheel based on the target assist torque Tat.

This assist control is repeatedly carried out during the steering operation.

As described above, the vehicle control device according to this embodiment performs the assist control on the steering wheel based on the target assist torque Tat accurately reflecting the driver's steering intention, and thus an assist characteristic with respect to the driver's steering operation can be changed in accordance with the driver's steering intention. For example, the assist torque calculation unit obtains a higher target assist torque Tat in a case where the driver's steering intention is the turn-and-steer steering intention than in a case where the driver's steering intention is the steering holding intention. Accordingly, the driver can obtain a steering sensation in accordance with his or her steering intention.

Figure 9:
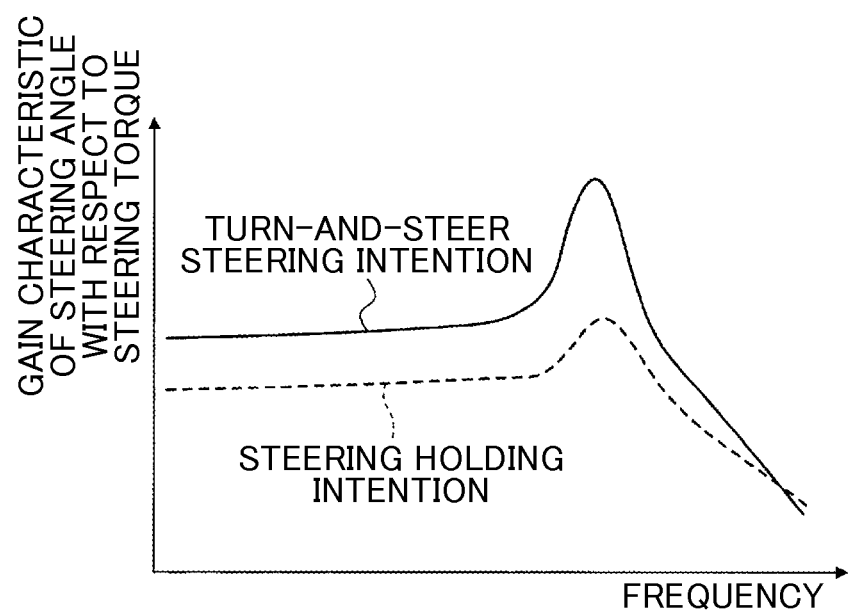
FIG. 9 is a diagram showing a gain characteristic of the steering angle with respect to the steering torque during the assist control.

Specifically, in a case where the driver's steering intention is the turn-and-steer steering intention for example, the assist torque calculation unit obtains the target assist torque Tat for a gain characteristic ($\theta s/Ts$) of the steering angle $\theta s$ with respect to the steering torque Ts to be greater than in a case where the driver's steering intention is the steering holding intention. In a case where the driver's steering intention is the steering holding intention, the assist torque calculation unit obtains the target assist torque Tat for the gain characteristic ($\theta s/Ts$) of the steering angle $\theta s$ with respect to the steering torque Ts to be less than in a case where the driver's steering intention is the turn-and-steer steering intention. FIG. 9 illustrates an example of the gain characteristic. According to this, the driver can be given a highly responsive steering sensation in accordance with the driver's steering intention when the driver has the turn-and-steer steering intention. The gain characteristic at the time of the turn-and-steer steering intention is useful during a slow steering operation.

Figure 10:
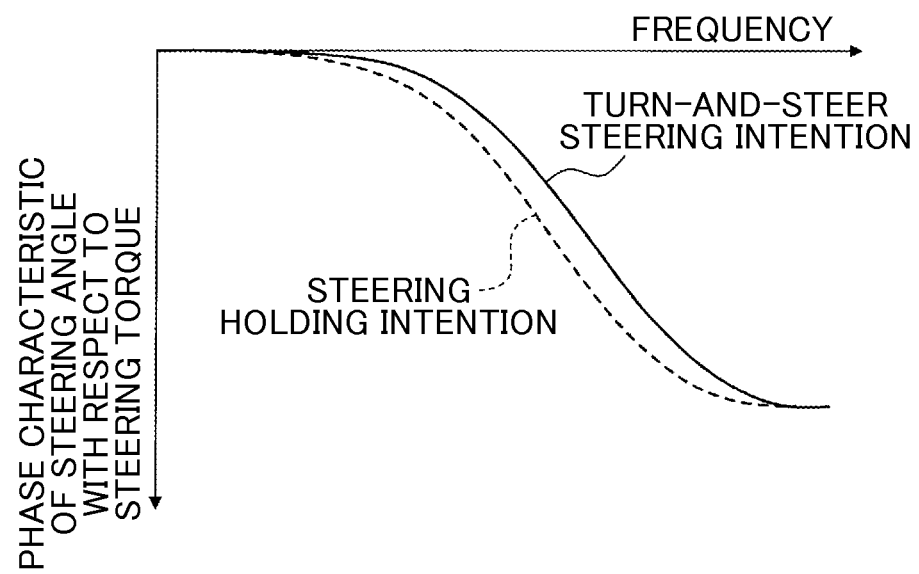
FIG. 10 is a diagram showing a phase characteristic of the steering angle with respect to the steering torque during the assist control.

In a case where the driver's steering intention is the turn-and-steer steering intention for example, the assist torque calculation unit may obtain the target assist torque Tat for a phase characteristic ($\theta s/Ts$) of the steering angle $\theta s$ with respect to the steering torque Ts to have a less phase delay than in a case where the driver's steering intention is the steering holding intention. In a case where the driver's steering intention is the steering holding intention, the assist torque calculation unit may obtain the target assist torque Tat for the phase characteristic ($\theta s/Ts$) of the steering angle $\theta s$ with respect to the steering torque Ts to have a greater phase delay than in a case where the driver's steering intention is the turn-and-steer steering intention. FIG. 10 illustrates an example of the phase characteristic. According to this, the driver can be given a highly responsive steering sensation in accordance with the driver's steering intention when the driver has the turn-and-steer steering intention. The phase characteristic at the time of the turn-and-steer steering intention is useful during a fast steering operation.

In a case where the driver's steering intention is the turn-and-steer steering intention for example, the assist torque calculation unit may allow the reference torque to be greater than in a case where the driver's steering intention is the steering holding intention. In a case where the driver's steering intention is the steering holding intention, the assist torque calculation unit may allow the reference torque to be less than in a case where the driver's steering intention is the turn-and-steer steering intention. According to this, the steering operation is performed with a small force in accordance with the driver's steering intention when the driver has the turn-and-steer steering intention, and thus a satisfactory steering sensation in accordance with the steering intention can be obtained. The reference torque at the time of the turn-and-steer steering intention is useful during the slow steering operation.

In a case where the driver's steering intention is the turn-and-steer steering intention for example, the assist torque calculation unit may allow the damping torque to be less than in a case where the driver's steering intention is the steering holding intention. In a case where the driver's steering intention is the steering holding intention, the assist torque calculation unit may allow the damping torque to be greater than in a case where the driver's steering intention is the turn-and-steer steering intention. According to this, the steering operation is performed with a small force in accordance with the driver's steering intention when the driver has the turn-and-steer steering intention, and thus a satisfactory steering sensation in accordance with the steering intention can be obtained. The damping torque at the time of the turn-and-steer steering intention is useful during the fast steering operation.

In a case where the driver's steering intention is the turn-and-steer steering intention for example, the assist torque calculation unit may allow the friction torque to be less than in a case where the driver's steering intention is the steering holding intention. In a case where the driver's steering intention is the steering holding intention, the assist torque calculation unit may allow the friction torque to be greater than in a case where the driver's steering intention is the turn-and-steer steering intention. According to this, the steering operation is performed with a small force in accordance with the driver's steering intention when the driver has the turn-and-steer steering intention, and thus a satisfactory steering sensation in accordance with the steering intention can be obtained. When the driver has the steering holding intention, the steering holding state is likely to be maintained in accordance with the driver's steering intention, and thus a satisfactory steering sensation in accordance with the steering intention can be obtained. The friction torque at the time of the turn-and-steer steering intention is useful during the slow steering operation.

In a case where the driver's steering intention is the turn-and-steer steering intention for example, the assist torque calculation unit may calculate the target assist torque Tat for the time differential value to be greater than in a case where the driver's steering intention is the steering holding intention. In a case where the driver's steering intention is the steering holding intention, the assist torque calculation unit may calculate the target assist torque Tat for the time differential value of the assist torque to be greater than in a case where the driver's steering intention is the turn-and-steer steering intention. According to this, the steering operation is performed with a small force in accordance with the driver's steering intention when the driver has the turn-and-steer steering intention, and thus the driver can be given a highly responsive steering sensation in accordance with the steering intention. The target assist torque Tat at the time of the turn-and-steer steering intention is useful during the fast steering operation.

In a case where the driver's steering intention is the switchback steering intention for example, the assist torque calculation unit may obtain the target assist torque Tat for the steering torque Ts to become zero when the steering angle $\theta s$ is zero regarding the characteristic (the gain characteristic or the phase characteristic described above) of the steering angle $\theta s$ with respect to the steering torque Ts. According to this, the steering torque Ts becomes zero when the steering wheel 11 returns to the neutral position if the driver has the switchback steering intention, and thus a comfortable and natural returning steering sensation can be realized.

In a case where the driver's steering intention is the switchback steering intention for example, the assist torque calculation unit may calculate the target assist torque Tat for the characteristic of the steering angular velocity $\theta s'$ with respect to the amount of change of the steering angle $\theta s$ to correspond, for example, to the restoring force of the self-aligning torque. According to this, the switchback steering can be performed at a natural returning speed when the driver has the switchback steering intention, and thus a comfortable and natural returning steering sensation can be realized.

In a case where the driver's steering intention is the switchback steering intention for example, the assist torque calculation unit may calculate the target assist torque Tat so that the target assist torque Tat with respect to the steering angle $\theta s$ has the same characteristic as in the case of the turn-and-steer steering intention, has the same characteristic as in the case of the steering holding intention, or has a characteristic between that of the case of the turn-and-steer steering intention and that of the case of the steering holding intention. According to this, the switchback steering can be performed with a characteristic equivalent to that of the previously performed turn-and-steer steering or steering holding when the driver has the switchback steering intention (that is, the switchback steering in accordance with the restoring force characteristic of the vehicle can be performed), and thus a comfortable and natural returning steering sensation can be realized.

Herein, it is desirable that the assist torque calculation unit calculates the target assist torque Tat for switching of the characteristic of the steering sensation to be performed smoothly at the timing of the switching. Specifically, the target assist torque Tat may be calculated for the characteristic to be gradually changed. According to this, the vehicle control device can suppress a rapid change of the steering sensation, and thus the driver's discomfort can be suppressed.

In a case where it is determined that the driver's steering intention is the switchback steering intention, the assist torque calculation unit may set the amount of change of the target assist torque Tat with respect to the amount of change of the steering angle $\theta s$ in accordance with the turning state quantity with respect to the steering angle $\theta s$ at the point in time of switching from the steering holding intention to the switchback steering intention and a vehicle characteristic (for example, fast or slow returning of the steering wheel 11 to the neutral position). According to this, the vehicle control device can realize a comfortable or discomfort-suppressed natural returning operation for the steering wheel 11.

Next, the front wheel turning characteristic control (steer characteristic control) will be described.

Figure 11:
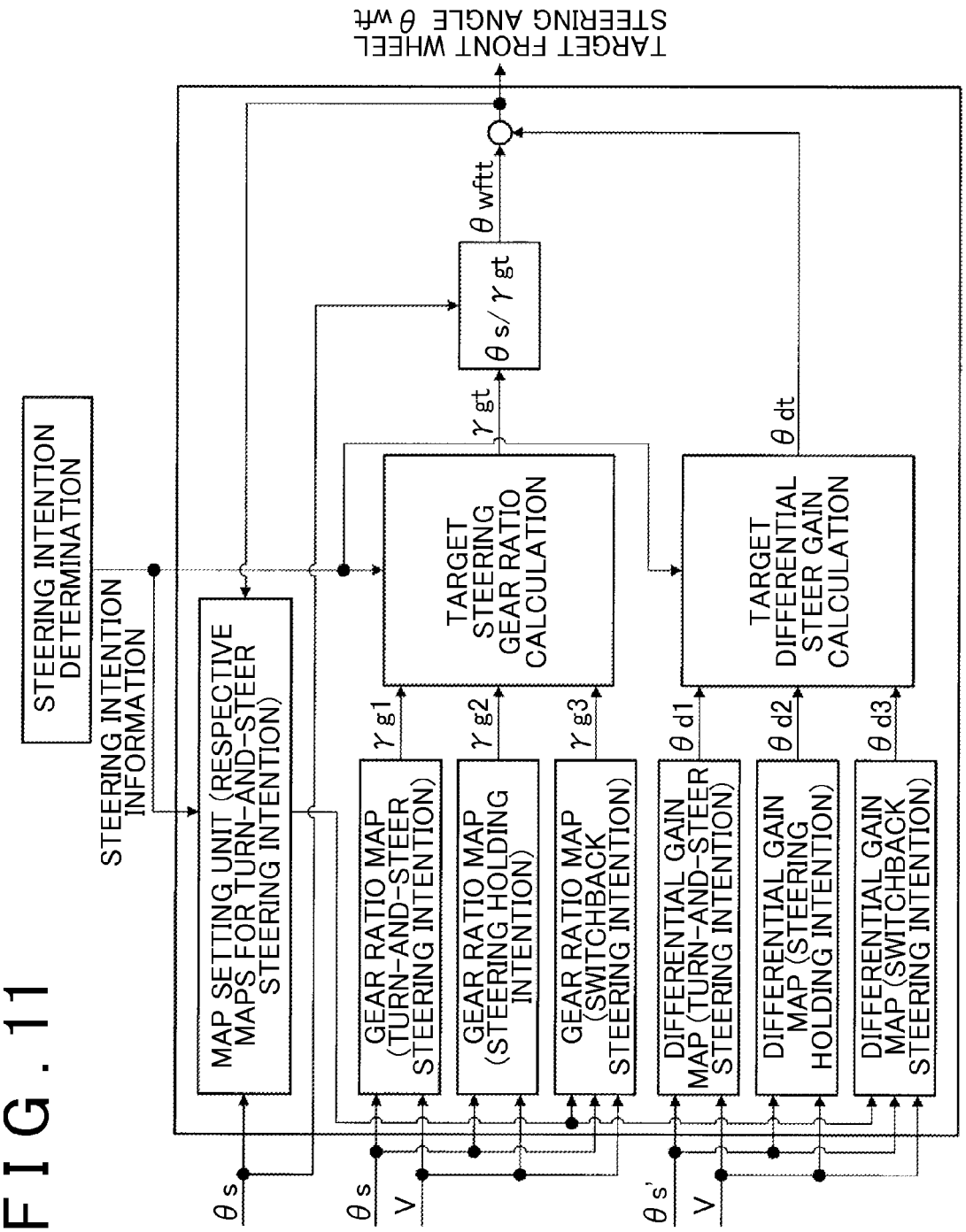
FIG. 11 is a block diagram relating to front wheel turning characteristic control (steer characteristic control)
Figure 12:
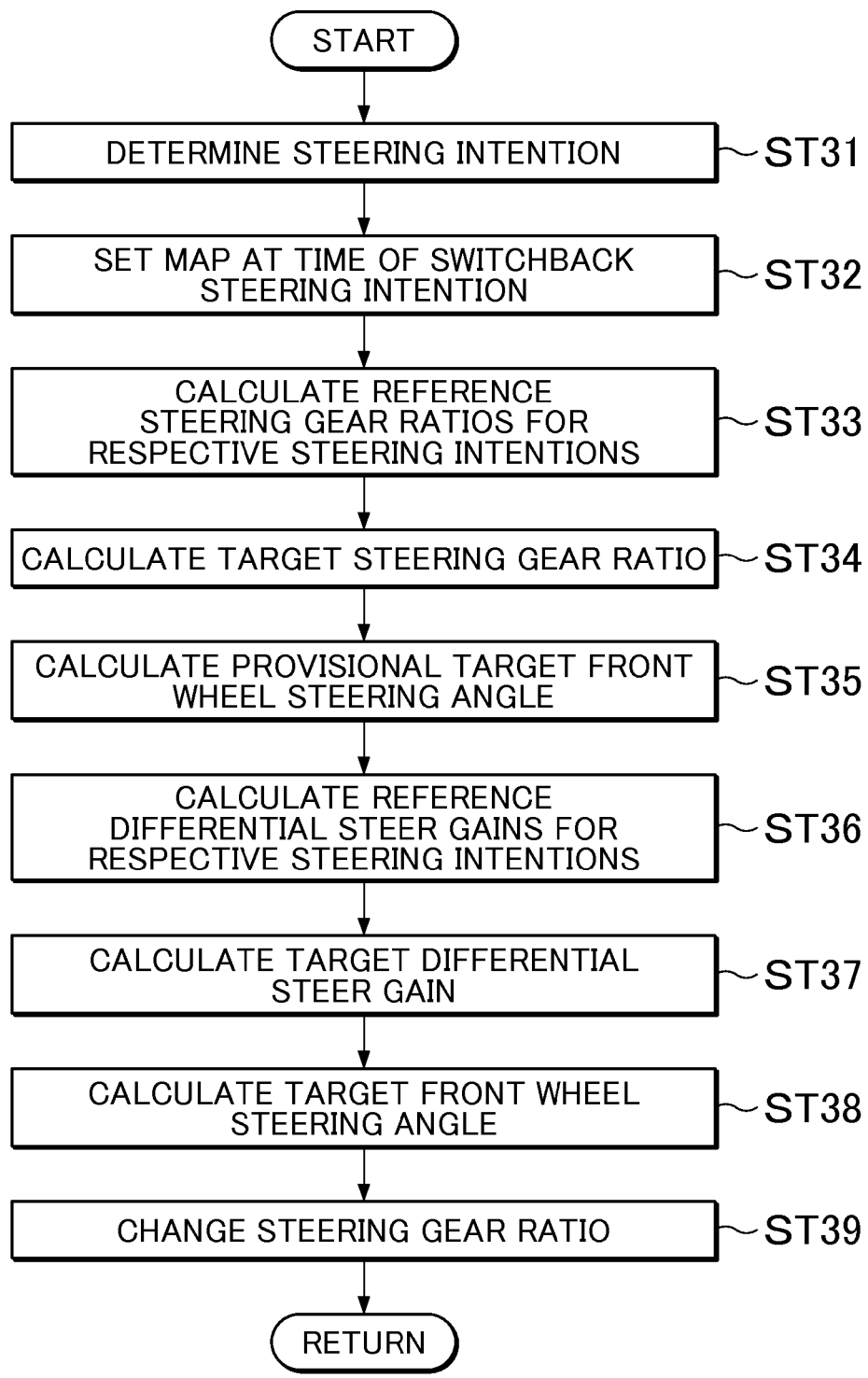
FIG. 12 is a flowchart showing the front wheel turning characteristic control (steer characteristic control)

A block diagram relating to the front wheel turning characteristic control is illustrated in FIG. 11. An example of a flowchart, relating to the front wheel turning characteristic control is illustrated in FIG. 12. In this example, the result of the determination of the steering intention (steering intention information) is received by the front wheel turning ECU 2 via the vehicle control ECU 4.

After the steering intention determination that is illustrated in FIGS. 3 and 4 is completed (Step ST31), a map setting unit of the front wheel turning ECU 2 sets a map during the switchback steering based on the result of the determination of the steering intention (steering intention information), the current steering angle θs, and a target front wheel steering angle θwft (Step ST32).

In Step ST32, a gear ratio map at the time of the switchback steering intention and a differential gain map at the time of the switchback steering intention are set.

The gear ratio map is a map for calculating a reference steering gear ratio γg corresponding to the steering angle θs and the vehicle speed V. The gear ratio map includes that at the time of the turn-and-steer steering intention, that at the time of the steering holding intention, and that at the time of the switchback steering intention. In Step ST32, the gear ratio map at the time of the switchback steering intention is corrected based on the driver's steering intention.

The differential gain map is a map for calculating a reference differential steer gain θd corresponding to the steering angular velocity θs' and the vehicle speed V. The differential gain map includes that at the time of the turn-and-steer steering intention, that at the time of the steering holding intention, and that at the time of the switchback steering intention. In Step ST32, the differential gain map at the time of the switchback steering intention is corrected based on the driver's steering intention.

The front wheel turning characteristic calculation unit calculates the respective reference steering gear ratios γg1, γg2, γg3 from the gear ratio maps for the respective steering intentions based on the steering angle θs and the vehicle speed V (Step ST33). Herein, the reference steering gear ratio γg1 at the time of the turn-and-steer steering intention, the reference steering gear ratio γg2 at the time of the steering holding intention, and the reference steering gear ratio γg3 at the time of the switchback steering intention are calculated.

Figure 13:
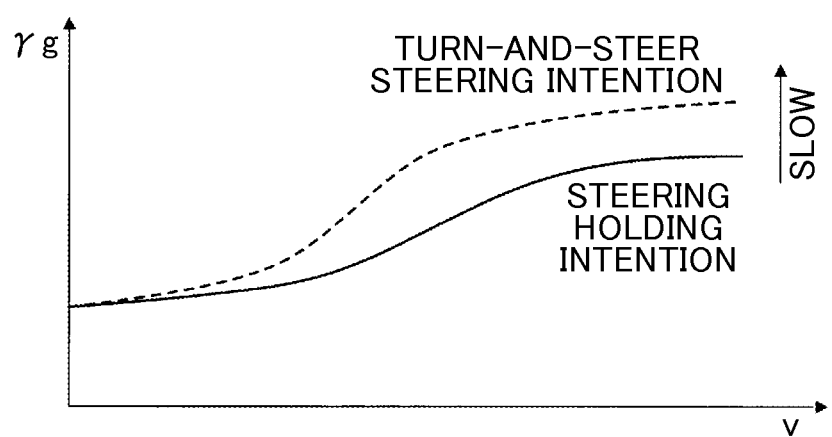
FIG. 13 is a diagram illustrating examples of gear ratio maps at the time of a turn-and-steer steering intention and at the time of a steering holding intention during the front wheel turning characteristic control.

Examples of the gear ratio map at the time of the turn-and-steer steering intention and the gear ratio map at the time of the steering holding intention are illustrated in FIG. 13. The reference steering gear ratio γg1 at the time of the turn-and-steer steering intention exceeds the reference steering gear ratio γg2 at the time of the steering holding intention in the case of the same vehicle speed V. Accordingly, the front wheel steering angle θwf with respect to the steering angle θs changes more slowly at the time of the turn-and-steer steering intention than at the time of the steering holding intention (slow).

The front wheel turning characteristic calculation unit calculates a target steering gear ratio γgt based on the respective reference steering gear ratios γg1, γg2, γg3 and the result of the determination of the steering intention (steering intention information) (Step ST34). In other words, the target steering gear ratio γgt reflecting the driver's steering intention is calculated herein.

The front wheel turning characteristic calculation unit calculates a provisional target front wheel steering angle θwftt (=θs/γgt) based on the target steering gear ratio γgt and the steering angle θs (Step ST35).

In addition, the front wheel turning characteristic calculation unit calculates the respective reference differential steer gains θd1, θd2, θd3 from the differential gain maps for the respective steering intentions based on the steering angular velocity θs' and the vehicle speed V (Step ST36). Herein, the reference differential steer gain θd1 at the time of the turn-and-steer steering intention, the reference differential steer gain θd2 at the time of the steering holding intention, and the reference differential steer gain θd3 at the time of the switchback steering intention are calculated.

Figure 14:
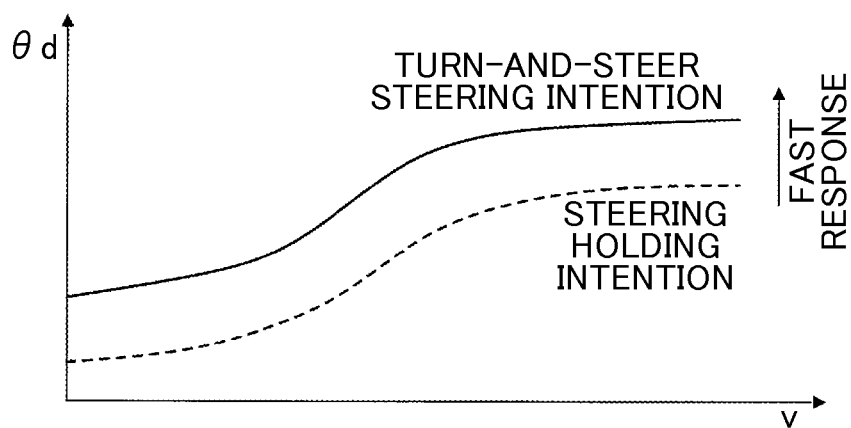
FIG. 14 is a diagram illustrating examples of differential gain maps at the time of the turn-and-steer steering intention and at the time of the steering holding intention during the front wheel turning characteristic control.

Examples of the differential gain map at the time of the turn-and-steer steering intention and the differential gain map at the time of the steering holding intention are illustrated in FIG. 14. The reference differential steer gain θd1 at the time of the turn-and-steer steering intention exceeds the reference differential steer gain θd2 at the time of the steering holding intention in the case of the same vehicle speed V. Accordingly, the front wheels Wf can be turned more responsively at the time of the turn-and-steer steering intention than at the time of the steering holding intention.

The front wheel turning characteristic calculation unit calculates a target differential steer gain θdt for phase compensation based on the respective reference differential steer gains θd1, θd2, θd3 and the result of the determination of the steering intention (steering intention information) (Step ST37). In other words, the target differential steer gain θdt for phase compensation reflecting the driver's steering intention is calculated herein.

The front wheel turning characteristic calculation unit calculates the phase-compensated target front wheel steering angle θwft by adding the target differential steer gain θdt to the provisional target front wheel steering angle θwftt (Step ST38).

The front wheel turning characteristic control unit changes the steering gear ratio by controlling the gear ratio variable unit 31 for the target steering gear ratio γgt (Step ST39).

This front wheel turning characteristic control is repeatedly carried out during the steering operation.

As described above, the vehicle control device according to this embodiment performs the front wheel turning characteristic control based on the target steering gear ratio γgt accurately reflecting the driver's steering intention, and thus the amount of change of the turning state quantity of the vehicle with respect to the amount of change of the steering angle θs can be changed in accordance with the driver's steering intention. In other words, the vehicle control device can change the steer characteristic of the vehicle with respect to the driver's steering operation in accordance with the driver's steering intention. Accordingly, the driver can feel a vehicle behavior in accordance with his or her steering intention.

Figure 15:
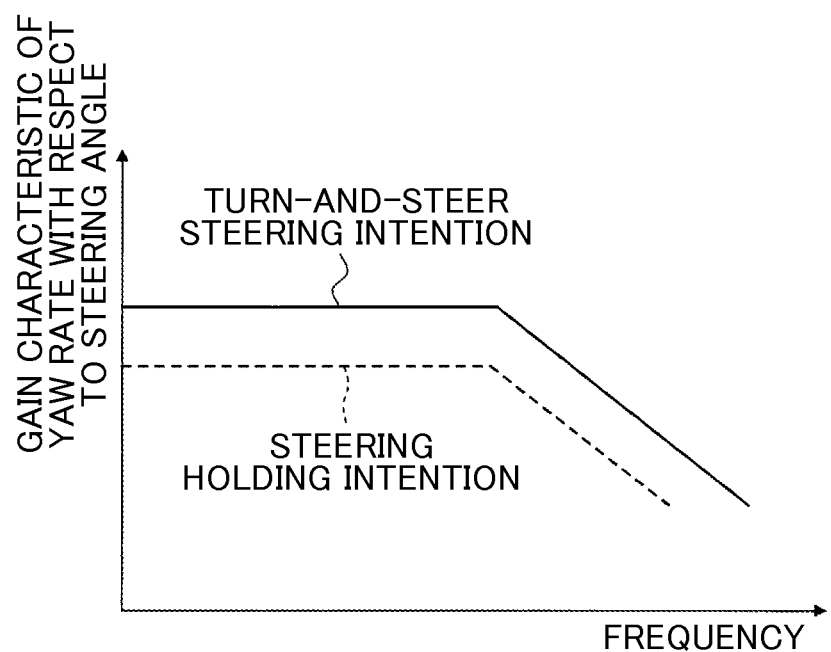
FIG. 15 is a diagram showing a gain characteristic of a yaw rate with respect to the steering angle during the front wheel turning characteristic control.

In a case where the driver's steering intention is the turn-and-steer steering intention for example, the front wheel turning characteristic calculation unit obtains the target steering gear ratio γgt for a gain characteristic (γ/θs) of the yaw rate γ with respect to the steering angle θs to be greater than in a case where the driver's steering intention is the steering holding intention. In a case where the driver's steering intention is the steering holding intention, the front wheel turning characteristic calculation unit obtains the target steering gear ratio γgt for the gain characteristic (γ/θs) of the yaw rate γ with respect to the steering angle θs to be less than in a case where the driver's steering intention is the turn-and-steer steering intention. FIG. 15 illustrates an example of the gain characteristic. In other words, in a case where the driver's steering intention is the turn-and-steer steering intention, the target steering gear ratio γgt is set for the amount of change of the turning state quantity with respect to the amount of change of the steering angle θs to be greater than in a case where the driver's steering intention is the steering holding intention. According to this, a highly responsive steer characteristic corresponding to the driver's steering intention can be obtained when the driver has the turn-and-steer steering intention. The gain characteristic at the time of the turn-and-steer steering intention is useful during the slow steering operation.

Figure 16:
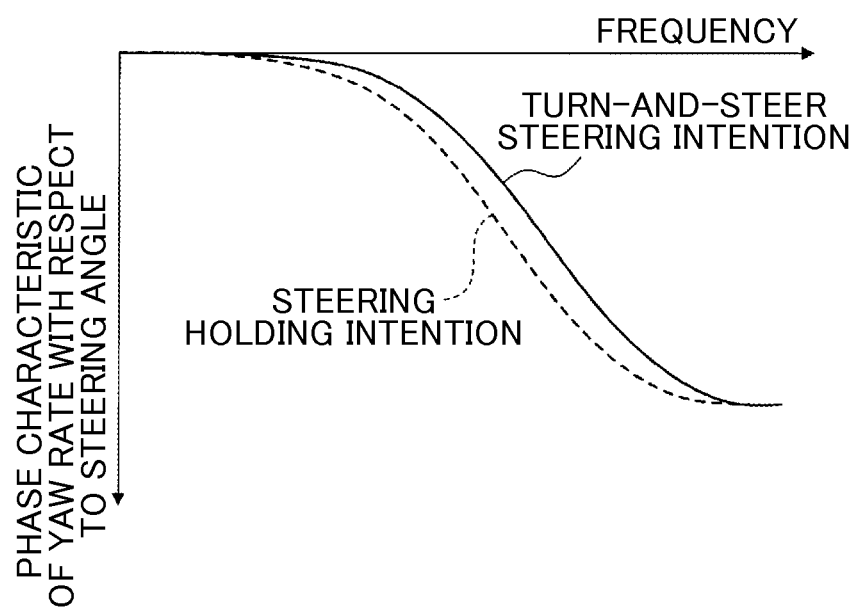
FIG. 16 is a diagram showing a phase characteristic of the yaw rate with respect to the steering angle during the front wheel turning characteristic control.

In a case where the driver's steering intention is the turn-and-steer steering intention for example, the front wheel turning characteristic calculation unit may obtain the target steering gear ratio γgt for a phase characteristic (γ/θs) of the yaw rate γ with respect to the steering angle θs to have a less phase delay than in a case where the driver's steering intention is the steering holding intention. In a case where the driver's steering intention is the steering holding intention, the front wheel turning characteristic calculation unit may obtain the target steering gear ratio γgt for the phase characteristic (γ/θs) of the yaw rate γ with respect to the steering angle θs to have a greater phase delay than in a case where the driver's steering intention is the turn-and-steer steering intention. FIG. 16 illustrates an example of the phase characteristic. According to this, a highly responsive steer characteristic corresponding to the driver's steering intention can be obtained when the driver has the turn-and-steer steering intention. The phase characteristic at the time of the turn-and-steer steering intention is useful during the fast steering operation.

Figure 17:
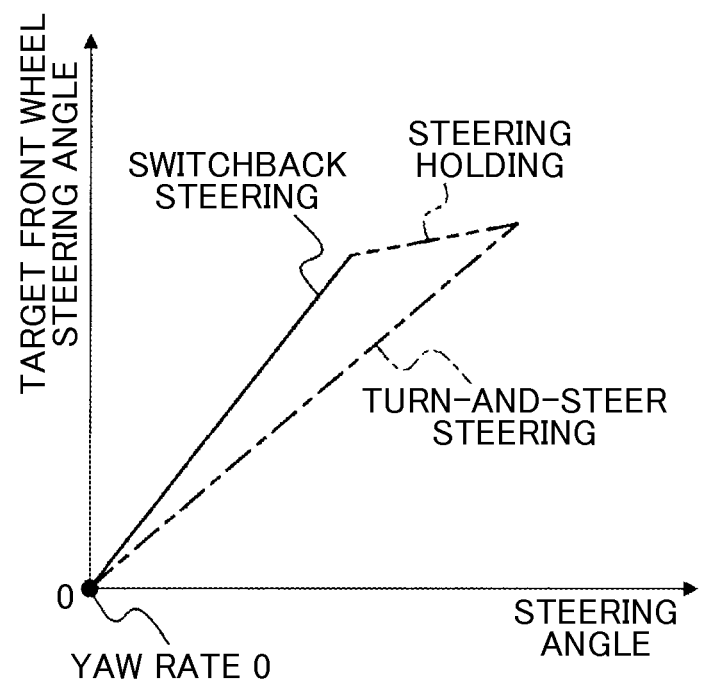
FIG. 17 is a diagram illustrating an example of a characteristic of a target front wheel steering angle with respect to the steering angle at the time of a switchback steering intention during the front wheel turning characteristic control.

In a case where the driver's steering intention is the switchback steering intention for example, the front wheel turning characteristic calculation unit may obtain the target steering gear ratio γgt for the yaw rate γ to become zero when the steering angle θs is zero regarding the characteristic (the gain characteristic or the phase characteristic described above) of the yaw rate γ with respect to the steering angle θs. FIG. 17 illustrates an example of the characteristic from the viewpoint of the target front wheel steering angle θwft with respect to the steering angle θs. Herein, the target steering gear ratio γgt is set for the target front wheel steering angle θwft to become zero when the steering angle θs is zero in a case where the driver's steering intention is the switchback steering intention. In other words, herein, the amount of change of the turning state quantity with respect to the amount of change of the steering angle θs is set in accordance with the turning state quantity and the vehicle characteristic with respect to the steering angle θs at the point in time of switching from the steering holding intention to the switchback steering intention in a case where it is determined that the driver's steering intention is the switchback steering intention. According to this, the yaw rate γ becomes zero when the steering wheel 11 returns to the neutral position if the driver has the switchback steering intention, and thus a comfortable and natural returning behavior of the vehicle can be realized.

Figure 18:
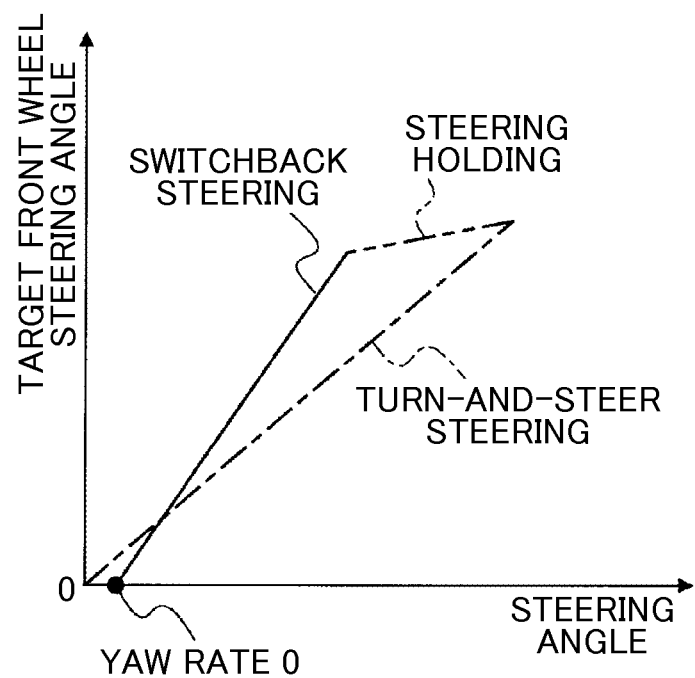
FIG. 18 is a diagram illustrating an example of the characteristic of the target front wheel steering angle with respect to the steering angle at the time of the switchback steering intention during the front wheel turning characteristic control.

In a case where the driver's steering intention is the switchback steering intention for example, the front wheel turning characteristic calculation unit may obtain the target steering gear ratio γgt for the yaw rate γ to become zero in a state where the steering angle θs is a predetermined angle before returning to zero regarding the characteristic (the gain characteristic or the phase characteristic described above) of the yaw rate γ with respect to the steering angle θs. The predetermined angle is the steering angle θs in the vicinity of the neutral position. FIG. 18 illustrates an example of the characteristic from the viewpoint of the target front wheel steering angle θwft with respect to the steering angle θs. Herein, the target steering gear ratio γgt is set for the target front wheel steering angle θwft to become zero in the state where the steering angle θs is the predetermined angle before returning to zero in a case where the driver's steering intention is the switchback steering intention. In other words, herein, the amount of change of the turning state quantity with respect to the amount of change of the steering angle θs is set in accordance with the turning state quantity and the vehicle characteristic with respect to the steering angle θs at the point in time of switching from the steering holding intention to the switchback steering intention in a case where the driver's steering intention is the switchback steering intention. According to this, the yaw rate γ becomes zero when the steering wheel 11 returns to the vicinity of the neutral position, even in the case of the vehicle characteristic in which the steering wheel 11 is less likely to return to the neutral position, if the driver has the switchback steering intention, and thus a comfortable and natural returning behavior of the vehicle can be realized.

Figure 19:
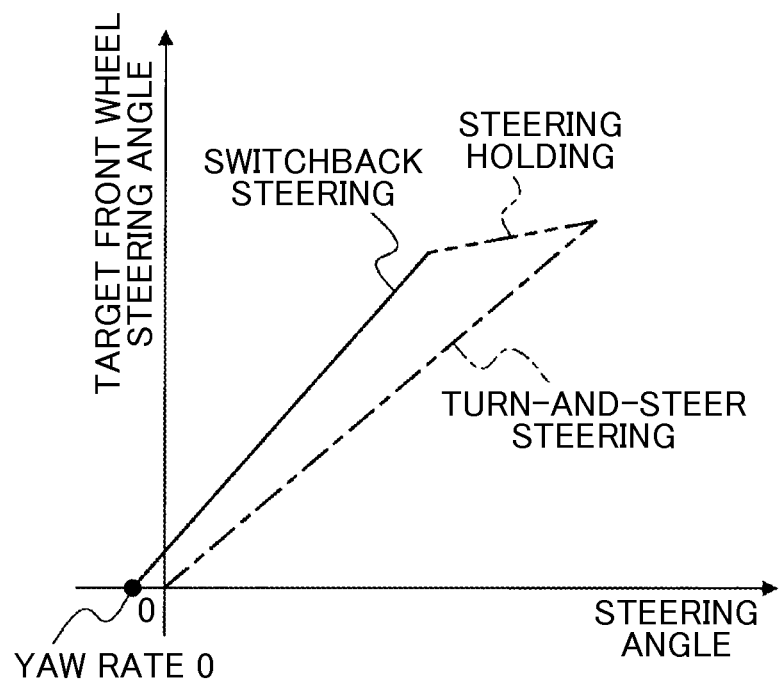
FIG. 19 is a diagram illustrating an example of the characteristic of the target front wheel steering angle with respect to the steering angle at the time of the switchback steering intention during the front wheel turning characteristic control.

In a case where the driver's steering intention is the switchback steering intention for example, the front wheel turning characteristic calculation unit may obtain the target steering gear ratio γgt for the yaw rate γ to become zero when the steering angle θs is steering-operated by a predetermined angle further toward the opposite side after returning to zero regarding the characteristic (the gain characteristic or the phase characteristic described above) of the yaw rate γ with respect to the steering angle θs. The predetermined angle is the steering angle θs in the vicinity of the neutral position. FIG. 19 illustrates an example of the characteristic from the viewpoint of the target front wheel steering angle θwft with respect to the steering angle θs. Herein, the target steering gear ratio γgt is set for the target front wheel steering angle θwft to become zero when the steering angle θs is steering-operated by the predetermined angle further toward the opposite side after returning to zero in a case where the driver's steering intention is the switchback steering intention. In other words, herein, the amount of change of the turning state quantity with respect to the amount of change of the steering angle θs is set in accordance with the turning state quantity and the vehicle characteristic with respect to the steering angle θs at the point in time of switching from the steering holding intention to the switchback steering intention in a case where the driver's steering intention is the switchback steering intention. According to this, the yaw rate γ becomes zero after the steering wheel 11 slightly passes the neutral position, even in the case of the vehicle characteristic in which the steering wheel 11 returns fast to the neutral position, if the driver has the switchback steering intention, and thus the occurrence of a reverse yaw rate γ at the neutral position (so-called overshoot of the yaw rate γ) can be suppressed and a comfortable and natural returning behavior of the vehicle can be realized.

In a case where the driver's steering intention is the switchback steering intention for example, the front wheel turning characteristic calculation unit may obtain the target steering gear ratio γgt for the yaw rate γ to become zero when the steering angle θs is zero regarding the characteristic (the gain characteristic or the phase characteristic described above) of the yaw rate γ with respect to the steering angle θs and the characteristic during the switchback steering intention has a curve of a quadratic function.

Figure 20:
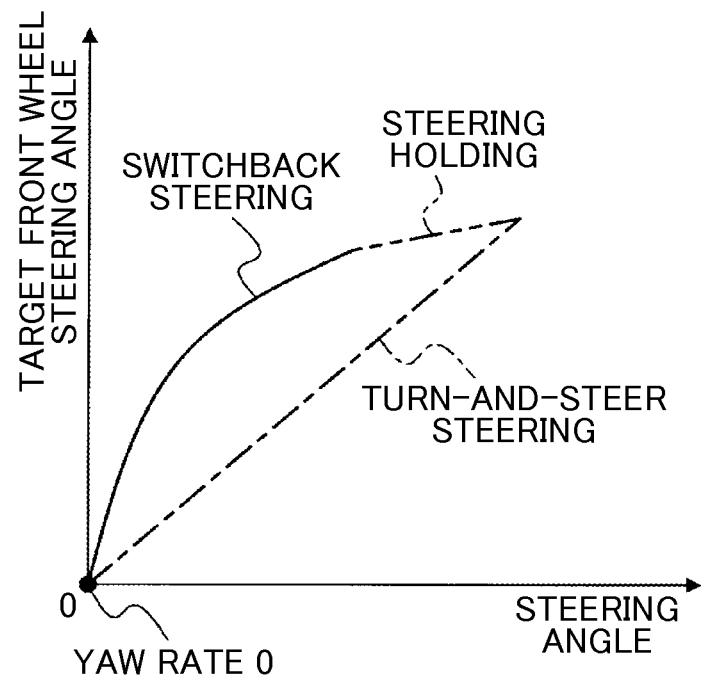
FIG. 20 is a diagram illustrating an example of the characteristic of the target front wheel steering angle with respect to the steering angle at the time of the switchback steering intention during the front wheel turning characteristic control.

Specifically, the target steering gear ratio γgt is obtained for the amount of change of the yaw rate γ with respect to the amount of change of the steering angle θs to be less than during the turn-and-steer steering intention before the switchback steering intention in an area with a large steering angle θs during the switchback steering intention and to be greater than during the turn-and-steer steering intention in an area with a small steering angle θs during the switchback steering intention. In other words, herein, the target steering gear ratio γgt is obtained for the characteristic to have an upwardly convex quadratic function. FIG. 20 illustrates an example of the characteristic from the viewpoint of the target front wheel steering angle θwft with respect to the steering angle θs. In a case where the driver's steering intention is the switchback steering intention herein, the target steering gear ratio γgt is calculated for the amount of change of the target front wheel steering angle θwft with respect to the amount of change of the steering angle θs to be less than during the turn-and-steer steering intention before the switchback steering intention in the area with a large steering angle θs during the switchback steering intention and to be greater than during the turn-and-steer steering intention in the area with a small steering angle θs during the switchback steering intention and for the target front wheel steering angle θwft to become zero when the steering angle θs is zero. In other words, herein, the amount of change of the turning state quantity with respect to the amount of change of the steering angle θs is set in accordance with the turning state quantity and the vehicle characteristic with respect to the steering angle θs at the point in time of switching from the steering holding intention to the switchback steering intention in a case where the driver's steering intention is the switchback steering intention. According to this, the overshoot of the yaw rate γ at the time of the returning of the steering wheel 11 to the neutral position can be suppressed, even in the case of the vehicle characteristic in which the steering wheel 11 returns fast to the neutral position, if the driver has the switchback steering intention, and thus a comfortable and natural returning behavior of the vehicle can be realized.

Figure 21:
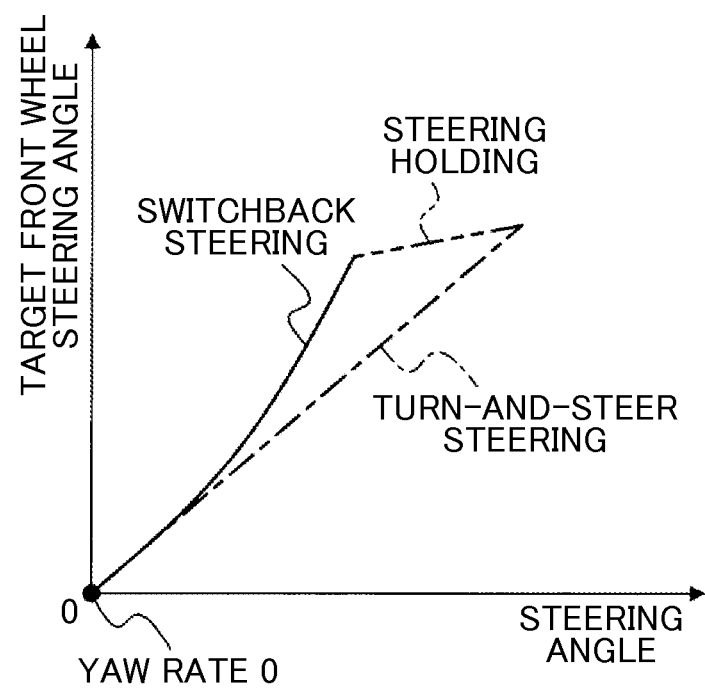
FIG. 21 is a diagram illustrating an example of the characteristic of the target front wheel steering angle with respect to the steering angle at the time of the switchback steering intention during the front wheel turning characteristic control.

In contrast, in a case where the driver's steering intention is the switchback steering intention, the front wheel turning characteristic calculation unit may obtain the target steering gear ratio γgt for the amount of change of the yaw rate γ with respect to the amount of change of the steering angle θs to be greater than during the turn-and-steer steering intention before the switchback steering intention in the area with a large steering angle θs during the switchback steering intention and to be less than during the turn-and-steer steering intention in the area with a small steering angle θs during the switchback steering intention. In other words, herein, the target steering gear ratio γgt is obtained for the characteristic to have a downwardly convex quadratic function. FIG. 21 illustrates an example of the characteristic from the viewpoint of the target front wheel steering angle θwft with respect to the steering angle θs. In a case where the driver's steering intention is the switchback steering intention herein, the target steering gear ratio γgt is calculated for the amount of change of the target front wheel steering angle θwft with respect to the amount of change of the steering angle θs to be greater than during the turn-and-steer steering intention before the switchback steering intention in the area with a large steering angle θs during the switchback steering intention and to be less than during the turn-and-steer steering intention in the area with a small steering angle θs during the switchback steering intention and for the target front wheel steering angle θwft to become zero when the steering angle θs is zero. In other words, herein, the amount of change of the turning state quantity with respect to the amount of change of the steering angle θs is set in accordance with the turning state quantity and the vehicle characteristic with respect to the steering angle θs at the point in time of switching from the steering holding intention to the switchback steering intention in a case where the driver's steering intention is the switchback steering intention. According to this, the operation for returning the steering wheel 11 to the neutral position can be performed with ease, even in the case of the vehicle characteristic in which the steering wheel 11 returns slowly to the neutral position, if the driver has the switchback steering intention, and thus a comfortable and natural returning behavior of the vehicle can be realized.

Herein, it is desirable that the front wheel turning characteristic calculation unit calculates the target steering gear ratio γgt for switching between the characteristics to be performed smoothly at the timing of the switching. Specifically, the target steering gear ratio γgt may be calculated for the characteristic to be gradually changed. According to this, the vehicle control device can suppress a rapid change of the vehicle behavior, and thus the driver's discomfort can be suppressed.

In addition, the front wheel turning characteristic calculation unit may, for example, calculate the target steering gear ratio γgt for the characteristic to be switched instantly in a case where the change of the characteristics before and after the switching is absent or the change is little at the timing of the switching between the characteristics. According to this, the vehicle control device can switch the characteristic fast, and thus the driver's discomfort can be suppressed.

In addition, the front wheel turning characteristic calculation unit may, for example, calculate the target steering gear ratio γgt for the switching between the characteristics to be carried out when the steering angular velocity θs' is zero or when the steering angular velocity θs' is approximately zero. The front wheel steering angle variable device 30 performs steering gear ratio variable control, and thus the vehicle control device can suppress the driver's discomfort by performing the switching of the characteristic at the time of the steering angular velocity θs'.

In addition, the front wheel turning characteristic calculation unit may, for example, calculate the target steering gear ratio γgt for the switching between the characteristics to be carried out when the steering power P is zero or when the steering power P is approximately zero. According to this, the vehicle control device can change the characteristic at the part of the switching of the driver's steering intention, and thus the driver's discomfort can be suppressed.

In addition, the front wheel turning characteristic calculation unit may, for example, calculate the target steering gear ratio γgt for the switching between the characteristics to be carried out immediately or in the earliest stage possible if the steering power P starts to decrease. According to this, the vehicle control device can change the characteristic until the driver has the subsequent and different steering intention, and thus the driver's steering intention can respected and the driver's discomfort can be suppressed.

Next, the rear wheel turning control (steer characteristic control) will be described.

Figure 22:
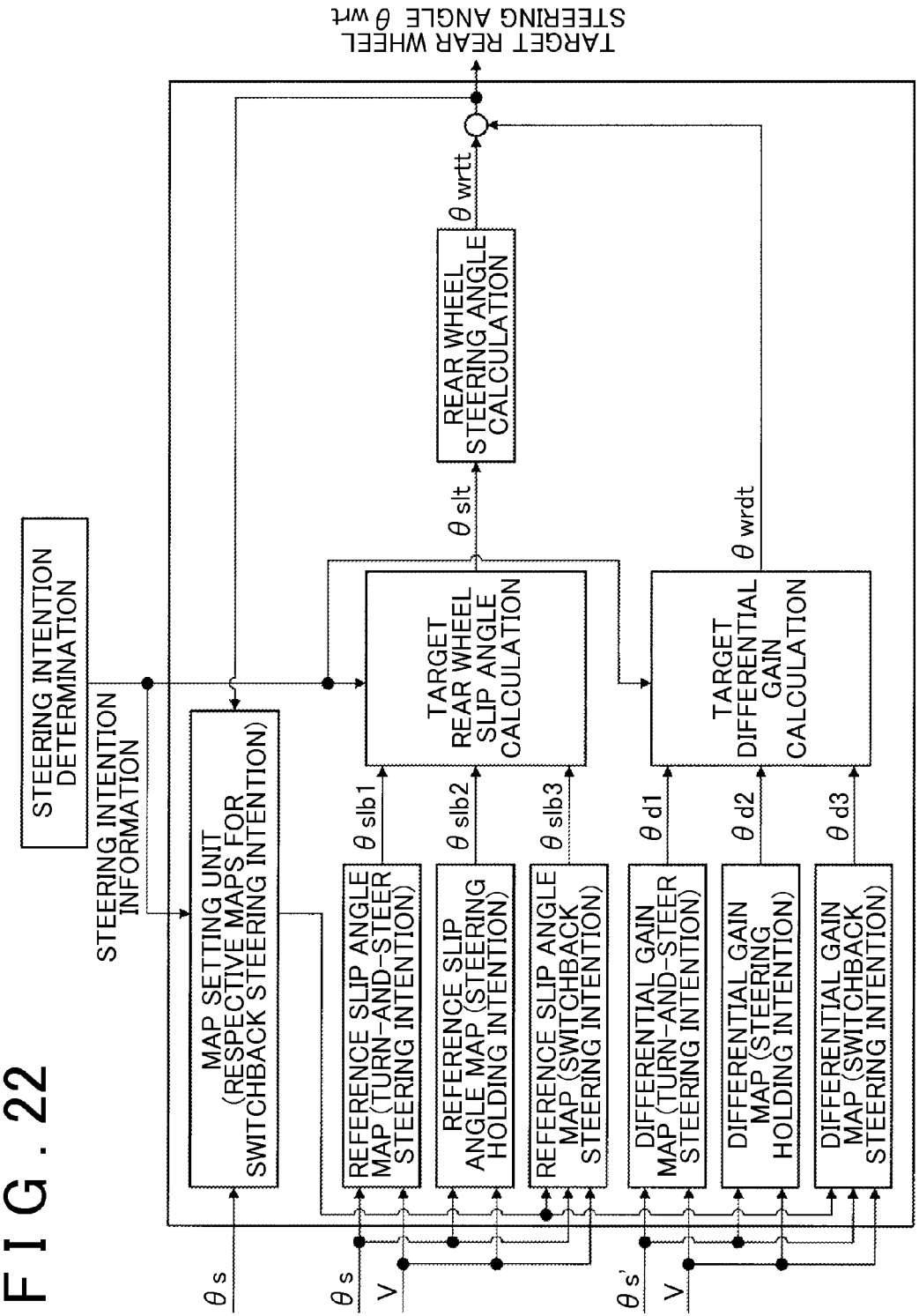
FIG. 22 is a block diagram relating to rear wheel turning control (steer characteristic control)
Figure 23:
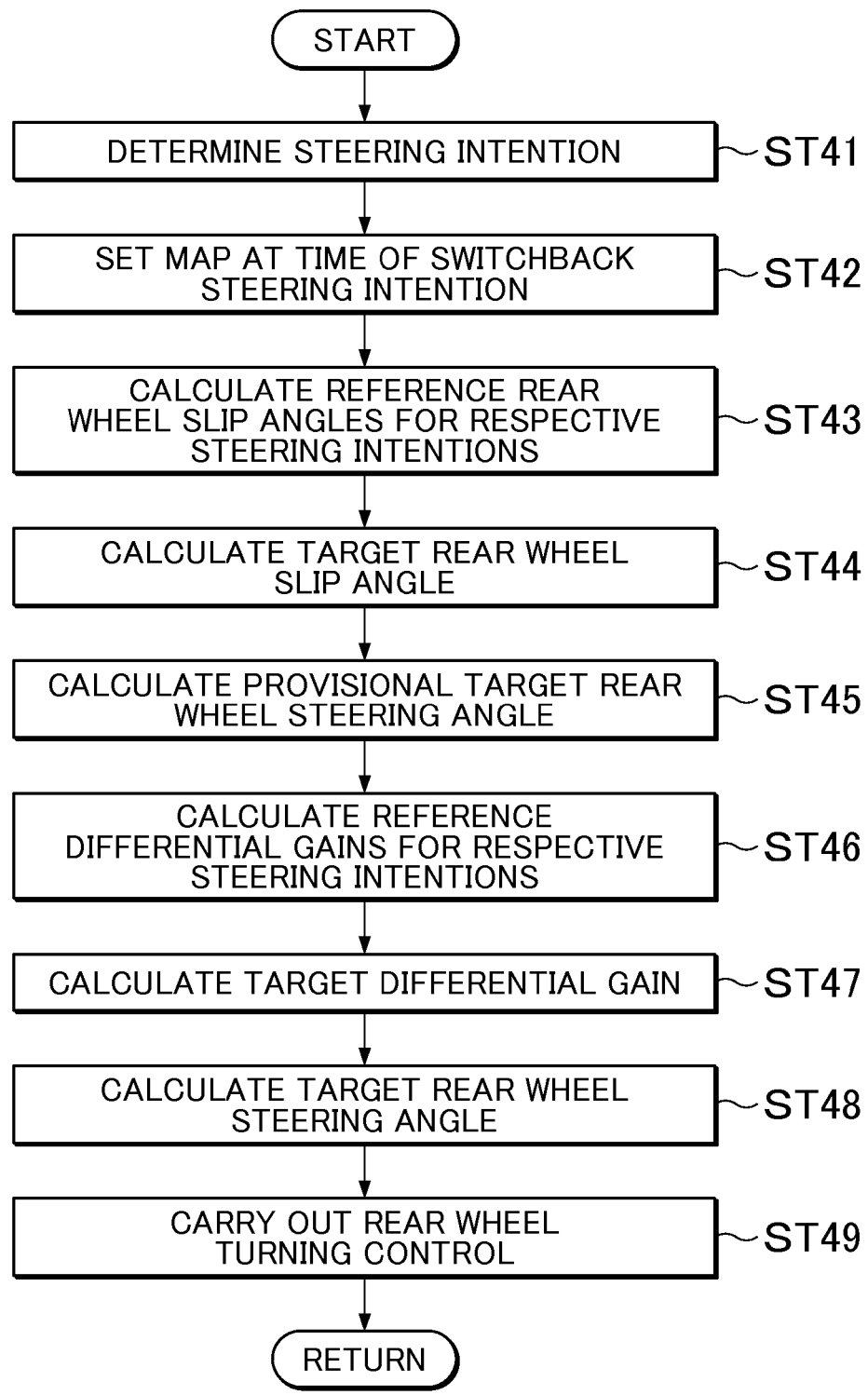
FIG. 23 is a flowchart showing the rear wheel turning control (steer characteristic control)

A block diagram relating to the rear wheel turning control is illustrated in FIG. 22. A flowchart relating to the rear wheel turning control is illustrated in FIG. 23. In this example, the result of the determination of the steering intention (steering intention information) is received by the rear wheel turning ECU 3 via the vehicle control ECU 4.

After the steering intention determination that is illustrated in FIGS. 3 and 4 is completed (Step ST41), a map setting unit of the rear wheel turning ECU 3 sets a map at the time of the switchback steering based on the result of the determination of the steering intention (steering intention information), the current steering angle θs, and the target rear wheel steering angle θwrt (Step ST42).

In Step ST42, a rear wheel slip angle map at the time of the switchback steering intention and the differential gain map at the time of the switchback steering intention are set.

The rear wheel slip angle map is a map for calculating a reference rear wheel slip angle θslb corresponding to the steering angle θs and the vehicle speed V. The rear wheel slip angle map includes that at the time of the turn-and-steer steering intention, that at the time of the steering holding intention, and that at the time of the switchback steering intention. In Step ST42, the rear wheel slip angle map at the time of the switchback steering intention is corrected based on the driver's steering intention.

The differential gain map is a map for calculating a reference differential gain θsld corresponding to the steering angular velocity θs' and the vehicle speed V. The differential gain map includes that at the time of the turn-and-steer steering intention, that at the time of the steering holding intention, and that at the time of the switchback steering intention. In Step ST42, the differential gain map at the time of the switchback steering intention is corrected based on the driver's steering intention.

The rear wheel control amount calculation unit calculates the respective reference rear wheel slip angles θslb1, θslb2, θslb3 from the rear wheel slip angle maps for the respective steering intentions based on the steering angle θs and the vehicle speed V (Step ST43). Herein, the reference rear wheel slip angle θslb1 at the time of the turn-and-steer steering intention, the reference rear wheel slip angle θslb2 at the time of the steering holding intention, and the reference rear wheel slip angle θslb3 at the time of the switchback steering intention are calculated.

Figure 24:
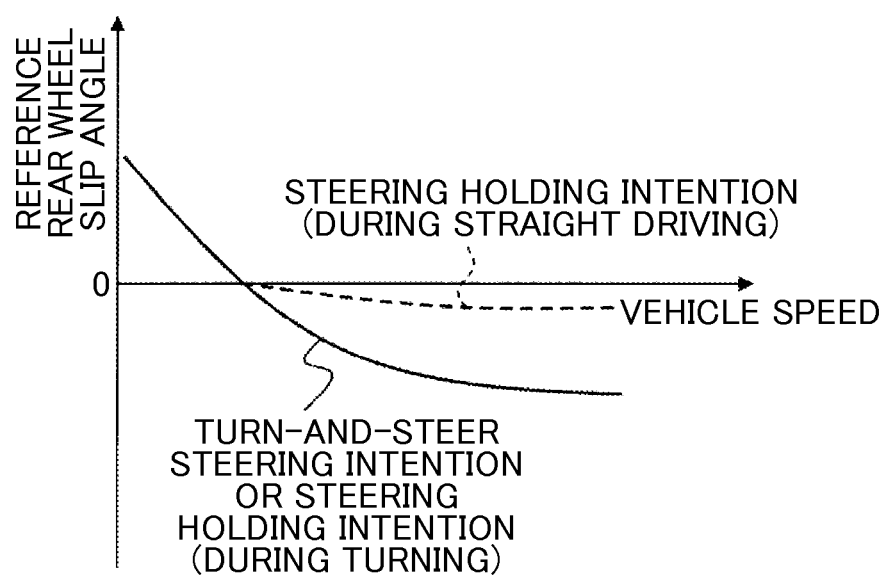
FIG. 24 is a diagram illustrating examples of rear wheel slip angle maps at the time of the turn-and-steer steering intention and at the time of the steering holding intention during the rear wheel turning control.

Examples of the rear wheel slip angle map at the time of the turn-and-steer steering intention and the rear wheel slip angle map at the time of the steering holding intention are illustrated in FIG. 24. The solid line in the drawing shows the reference rear wheel slip angle θslb1 at the time of the turn-and-steer steering intention corresponding to the vehicle speed V and the reference rear wheel slip angle θslb2 at the time of the steering holding intention during the turning corresponding to the vehicle speed V. The dashed line in FIG. 24 shows the reference rear wheel slip angle θslb2 at the time of the steering holding intention during the straight driving corresponding to the vehicle speed V.

The rear wheel control amount calculation unit calculates a target rear wheel slip angle θslt based on the respective reference rear wheel slip angles θslb1, θslb2, θslb3 and the result of the determination of the steering intention (steering intention information) (Step ST44). In other words, the target rear wheel slip angle θslt reflecting the driver's steering intention is calculated herein.

The rear wheel control amount calculation unit calculates a provisional target rear wheel steering angle θwrtt based on the target rear wheel slip angle θslt (Step ST45).

In addition, the rear wheel control amount calculation unit calculates the respective reference differential gains θd1, θd2, θd3 from the differential gain maps for the respective steering intentions based on the steering angular velocity θs' and the vehicle speed V (Step ST46). Herein, the reference differential gain θd1 at the time of the turn-and-steer steering intention, the reference differential gain θd2 at the time of the steering holding intention, and the reference differential gain θd3 at the time of the switchback steering intention are calculated.

The rear wheel control amount calculation unit calculates the target differential gain θwrdt for phase compensation based on the respective reference differential gains θd1, θd2, θd3 and the result of the determination of the steering intention (steering intention information) (Step ST47). In other words, the target differential gain θwrdt for phase compensation reflecting the driver's steering intention is calculated herein.

The rear wheel control amount calculation unit calculates the phase-compensated target rear wheel steering angle θwrt by adding the target differential gain θwrdt to the provisional target rear wheel steering angle θwrtt (Step ST48).

The rear wheel turning control unit turns the rear wheels Wr by controlling the turning force generating mechanism 41 for the target rear wheel steering angle θwrt (Step ST49).

During the steering operation, the rear wheel turning control is repeatedly carried out in a case where the target rear wheel steering angle θwrt exceeds zero.

As described above, the vehicle control device according to this embodiment performs the rear wheel turning control based on the target rear wheel steering angle θwrt accurately reflecting the driver's steering intention, and thus the amount of change of the turning state quantity (yaw moment γ and vehicle body slip angle β) of the vehicle with respect to the amount of change of the steering angle θs can be changed in accordance with the driver's steering intention. In other words, the vehicle control device can change the steer characteristic of the vehicle with respect to the driver's steering operation in accordance with the driver's steering intention. Accordingly, the driver can feel a vehicle behavior in accordance with his or her steering intention.

In a case where the driver's steering intention is the turn-and-steer steering intention for example, the rear wheel control amount calculation unit obtains the target rear wheel steering angle θwrt for a gain characteristic of the turning state quantity of the vehicle with respect to the steering angle θs to be greater than in a case where the driver's steering intention is the steering holding intention during the straight driving. In a case where the driver's steering intention is the steering holding intention during the straight driving, the rear wheel control amount calculation unit obtains the target rear wheel steering angle θwrt for the gain characteristic of the turning state quantity of the vehicle with respect to the steering angle θs to be less than in a case where the driver's steering intention is the turn-and-steer steering intention. According to this, the steer characteristic can be obtained from a highly responsive vehicle behavior change corresponding to the driver's steering intention when the driver has the turn-and-steer steering intention. The gain characteristic at the time of the turn-and-steer steering intention is useful during the slow steering operation.

In a case where the driver's steering intention is the turn-and-steer steering intention for example, the rear wheel control amount calculation unit may obtain the target rear wheel steering angle θwrt for the phase characteristic of the turning state quantity of the vehicle with respect to the steering angle θs to have a less phase delay than in a case where the driver's steering intention is the steering holding intention during the straight driving. In a case where the driver's steering intention is the steering holding intention during the straight driving for example, the rear wheel control amount calculation unit may obtain the target rear wheel steering angle θwrt for the phase characteristic of the turning state quantity of the vehicle with respect to the steering angle θs to have a greater phase delay than in a case where the driver's steering intention is the turn-and-steer steering intention. According to this, the steer characteristic can be obtained from a highly responsive vehicle behavior change corresponding to the driver's steering intention when the driver has the turn-and-steer steering intention. The phase characteristic at the time of the turn-and-steer steering intention is useful during the fast steering operation.

In a case where the driver's steering intention is the steering holding intention during the turning for example, the rear wheel control amount calculation unit may obtain the target rear wheel steering angle θwrt for the gain characteristic of the turning state quantity of the vehicle with respect to the steering angle θs to be greater than in a case where the driver's steering intention is the steering holding intention during the straight driving. In a case where the driver's steering intention is the steering holding intention during the straight driving for example, the rear wheel control amount calculation unit may obtain the target rear wheel steering angle θwrt for the gain characteristic of the turning state quantity of the vehicle with respect to the steering angle θs to be less than in a case where the driver's steering intention is the steering holding intention during the turning. According to this, the vehicle is likely to be held in the straight driving state when the driver has the steering holding intention during the straight driving. When the driver has the steering holding intention during the turning, the posture of the vehicle is likely to be maintained in the turning state. In this case, the posture of the vehicle corresponding to the driver's steering intention can be maintained. The target rear wheel steering angle θwrt at the time of the steering holding intention is useful during the slow steering operation.

In a case where the driver's steering intention is the switchback steering intention for example, the rear wheel control amount calculation unit may obtain the target rear wheel steering angle θwrt for the turning state quantity to become zero when the steering angle θs is zero regarding the characteristic (the gain characteristic or the phase characteristic described above) of the turning state quantity of the vehicle with respect to the steering angle θs. According to this, the turning state quantity becomes zero when the steering wheel 11 returns to the neutral position if the driver has the switchback steering intention, and thus a comfortable and natural returning behavior of the vehicle can be realized.

Herein, it is desirable that the rear wheel control amount calculation unit calculates the target rear wheel steering angle θwrt for switching between the characteristics to be performed smoothly at the timing of the switching. According to this, the vehicle control device can suppress a rapid change of the vehicle behavior, and thus the driver's discomfort can be suppressed.

As described above, the steering intention determination device and the vehicle control device according to this embodiment can accurately determine the driver's steering intention at every timing of the steering operation on a case-by-case basis. Accordingly, the steering intention determination device and the vehicle control device can carry out control on the vehicle side in accordance with the driver's steering intention, and the control on the vehicle side can be a comfortable or discomfort-reduced one in accordance with the driver's steering intention.

Herein, the steering intention determination that is performed by the steering intention determination unit may be hysteretic so as to improve the robustness of the determination and suppress unnecessary change of the control on the vehicle side.

What is claimed is:

1. A steering intention determination device comprising:
an electronic control unit (ECU) programmed to:
calculate a steering type discrimination value showing a driver's steering type with respect to a steering wheel based on a product of a steering angular velocity and a steering torque during a driver's steering operation at the steering wheel and a product of a steering angle and a time differential value of the steering torque during the driver's steering operation; and
determine that the driver has a turn-and-steer steering intention in a case where the steering type discrimination value is equal to or greater than a predetermined value, determine that the driver has a steering holding intention in a case where the steering type discrimination value is less than the predetermined value and an absolute value of the steering angular velocity is less than a predetermined angular velocity, and determine that the driver has a switchback steering intention in a case where the steering type discrimination value is less than the predetermined value and the absolute value of the steering angular velocity is equal to or greater than the predetermined angular velocity; and
control a vehicle based on the driver's steering intention.

2. The steering intention determination device according to claim 1,
wherein the ECU is further programmed to determine that the driver's steering intention is the steering holding intention during straight driving if the absolute value of the steering angle is less than a predetermined angle and determines that the driver's steering intention is the steering holding intention during turning if the absolute value of the steering angle is equal to or greater than a predetermined angle in a case where it is determined that the driver has the steering holding intention.

3. A vehicle control device comprising:
an electronic control unit (ECU) programmed to:
calculate a steering type discrimination value showing a driver's steering type with respect to a steering wheel based on a product of a steering angular velocity and a steering torque during a driver's steering operation at the steering wheel and a product of a steering angle and a time differential value of the steering torque during the driver's steering operation;
determine that the driver has a turn-and-steer steering intention in a case where the steering type discrimination value is equal to or greater than a predetermined value, determine that the driver has a steering holding intention in a case where the steering type discrimination value is less than the predetermined value and an absolute value of the steering angular velocity is less than a predetermined angular velocity, and determine that the driver has a switchback steering intention in a case where the steering type discrimination value is less than the predetermined value and the absolute value of the steering angular velocity is equal to or greater than the predetermined angular velocity; and
control on a vehicle side based on the driver's steering intention.

4. The vehicle control device according to claim 3,
wherein the ECU is further programmed to determine that the driver's steering intention is the steering holding intention during straight driving if the absolute value of the steering angle is less than a predetermined angle, and determines that the driver's steering intention is the steering holding intention during turning if the absolute value of the steering angle is equal to or greater than the predetermined angle, in a case where it is determined that the driver has the steering holding intention.

5. The vehicle control device according to claim 3,
wherein the amount of change of a turning state quantity with respect to the amount of change of the steering angle is allowed to be greater in a case where it is determined that the driver's steering intention is the turn-and-steer steering intention than in a case where it is determined that the driver's steering intention is the steering holding intention.

6. The vehicle control device according to claim 3,
wherein the ECU is further configured to set the amount of change of a turning state quantity with respect to the amount of change of the steering angle in accordance with the turning state quantity and a vehicle characteristic with respect to the steering angle at the point in time of switching from the steering holding intention to the switchback steering intention in a case where it is determined that the driver's steering intention is the switchback steering intention.

7. The vehicle control device according to claim 3,
wherein the ECU is further programmed to allow an assist torque of an electric power steering device to be greater in a case where it is determined that the driver's steering intention is the turn-and-steer steering intention than in a case where it is determined that the driver's steering intention is the steering holding intention.

8. The vehicle control device according to claim 3,
wherein the ECU is further configured to set the amount of change of an assist torque of the electric power steering device with respect to the amount of change of the steering angle in accordance with a turning state quantity and a vehicle characteristic with respect to the steering angle at the point in time of switching from the steering holding intention to the switchback steering intention in a case where it is determined that the driver's steering intention is the switchback steering intention.

9. A steering assist device comprising:
an ECU configured to:
calculate a discrimination value based on a product of a steering angular velocity of a steering wheel and a steering torque relating to the steering wheel and a product of a steering angle of the steering wheel and a time differential value of the steering torque relating to the steering wheel and calculate an assist torque based on the discrimination value; and
assist the steering wheel based on the assist torque.

10. A steering assist system comprising:
a first electronic control unit (ECU) programmed to (i) calculate a discrimination value based on a product of a steering angular velocity of a steering wheel and a steering torque relating to the steering wheel and a product of a steering angle of the steering wheel and a time differential value of the steering torque relating to the steering wheel and (ii) determine a steering type based on the discrimination value; and
a second ECU to control on a vehicle side based on the steering type determined by the first ECU,
wherein the steering type includes a first steering type in which the steering wheel is turned and steered, a second steering type in which the steering angle of the steering wheel is held, and a third steering type in which the steering wheel is switched back, and
wherein the first ECU is further programmed to determine that the steering type is the first steering type in a case where the discrimination value is equal to or greater than a predetermined value, determine that the steering type is the second steering type in a case where the discrimination value less than the predetermined value and an absolute value of the steering angular velocity is less than a predetermined value, and determine that the steering type is the third steering type in a case where the discrimination value is less than the predetermined value and the absolute value of the steering angular velocity is equal to or greater than the predetermined value.

* * * * *